(12) United States Patent
Zebiak et al.

(10) Patent No.: US 11,364,908 B2
(45) Date of Patent: Jun. 21, 2022

(54) AUTOMATIC FOLLOWING DISTANCE IN CRUISE CONTROL

(71) Applicant: GM GLOBAL TECHNOLOGY OPERATIONS LLC, Detroit, MI (US)

(72) Inventors: Matthew S. Zebiak, Ann Arbor, MI (US); Amanpal S. Grewal, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 16/787,692

(22) Filed: Feb. 11, 2020

(65) Prior Publication Data

US 2021/0245748 A1    Aug. 12, 2021

(51) Int. Cl.
| | | |
|---|---|---|
| *B60W 30/16* | (2020.01) | |
| *B60W 30/14* | (2006.01) | |
| *B60W 30/18* | (2012.01) | |
| *B60K 23/08* | (2006.01) | |
| *B60K 31/00* | (2006.01) | |

(52) U.S. Cl.
CPC ....... *B60W 30/162* (2013.01); *B60K 23/0808* (2013.01); *B60K 31/0008* (2013.01); *B60W 30/146* (2013.01); *B60W 30/18009* (2013.01); *B60K 2031/0025* (2013.01); *B60K 2031/0033* (2013.01); *B60W 2030/18081* (2013.01)

(58) Field of Classification Search
CPC ............. B60W 30/162; B60W 30/146; B60W 30/18009; B60W 2030/18081; B60W 2552/20; B60W 2720/106; B60W 10/06; B60W 10/184; B60W 10/30; B60W 30/18109; B60W 30/18127; B60W 2554/4042; B60W 2554/802; B60W 2556/50; B60W 2710/0666; B60W 2754/30; B60W 30/16; B60W 50/0097; B60W 2520/10; B60W 10/04; B60W 30/165; B60W 40/06; B60W 40/105; B60W 2554/80; B60W 2710/083; B60K 23/0808; B60K 31/0008; B60K 2031/0025; B60K 2031/0033
USPC .......................................................... 701/96
See application file for complete search history.

(56) References Cited

U.S. PATENT DOCUMENTS

| | | | |
|---|---|---|---|
| 6,128,559 A | 10/2000 | Saitou et al. | |
| 6,597,981 B2 * | 7/2003 | Nishira | ............ B60K 31/0008 |
| | | | 701/96 |
| 7,734,419 B2 * | 6/2010 | Kondoh | ................ B60K 35/00 |
| | | | 701/301 |

* cited by examiner

*Primary Examiner* — Maceeh Anwari
(74) *Attorney, Agent, or Firm* — Vivacqua Crane PLLC

(57) ABSTRACT

A cruise control method to control a driven vehicle includes: determining projected speeds of the driven vehicle at each of the predetermined-upcoming locations; determining a plurality of following times at each of the predetermined-upcoming locations of the driven vehicle and the projected speeds of the followed vehicle; determining whether at least one of the plurality of following times is less than the predetermined-minimum time threshold; and in response to determining that at least one plurality of following times is less than the predetermined-minimum time threshold, commanding, by the controller, the propulsion system of the driven vehicle to decrease the commanded axle torque by a torque adjustment in order to prevent each of the plurality of following times at each of the predetermined-upcoming locations from being less than the predetermined-minimum time threshold.

18 Claims, 14 Drawing Sheets

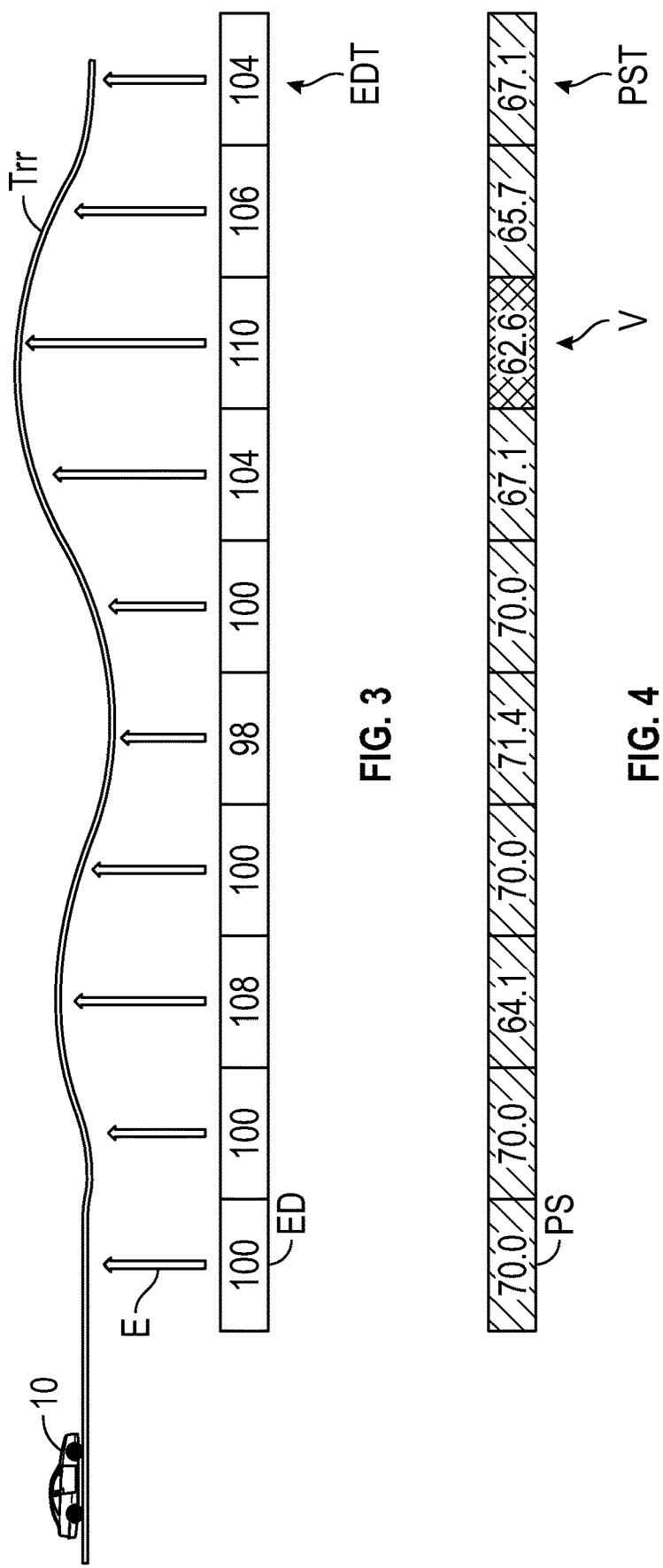

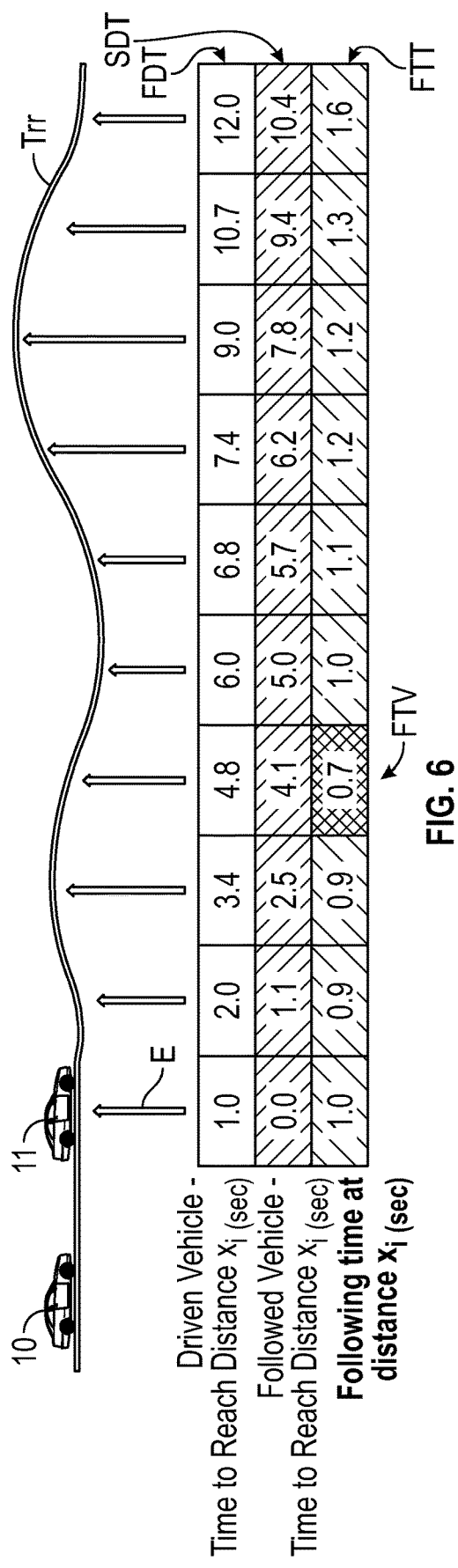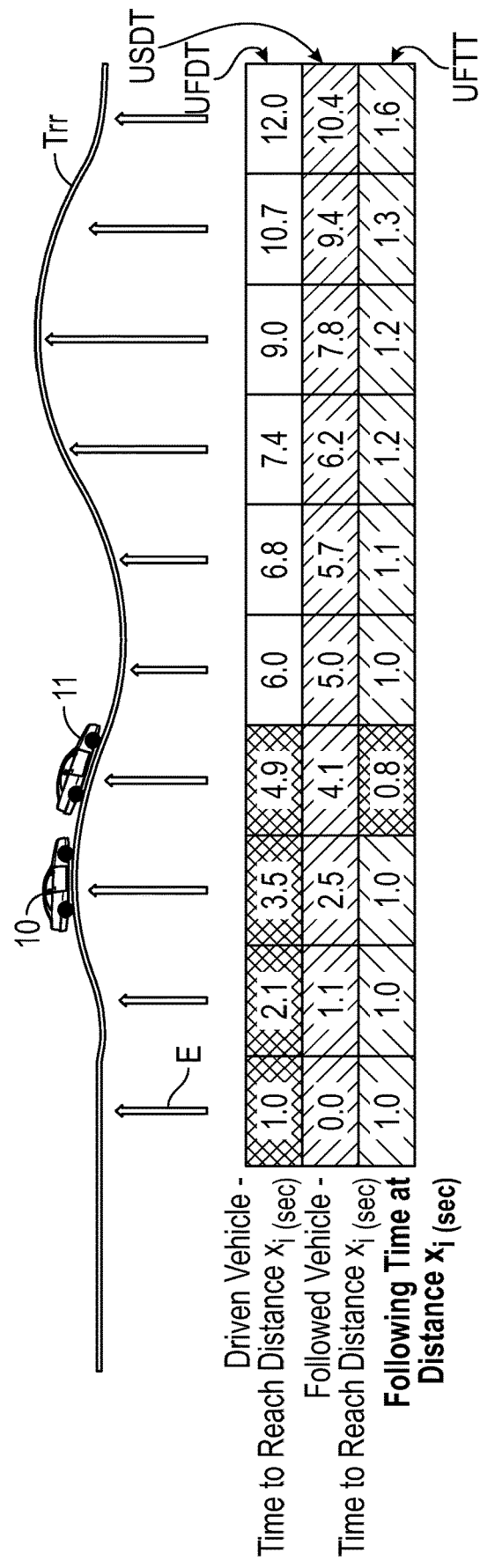
FIG. 6
FIG. 7

In Case of Violation If there is projected to be a violation of minimum following time before distance $D$, then axle torque command will be reduced to prevent the driven vehicle from too closely following the car in front. We will modify the axle torque command so that, at $x_{crit}$, (the distance at which the violation occurs):

$$V_{veh}(x_{crit}) = V_f(x_{crit}) \text{ and } \left(t(x_{crit}) - t_f(x_{crit})\right) = \beta * t^*_{min}.$$

Where $\beta$ is a calibratable safety factor, larger than $\alpha$ used above. In other words, this will ensure that we target an acceptable following time ($\beta t^*_{min}$), and match the speed of the vehicle in front at this minimum following time. The axle torque change required to achieve these conditions is summarized in the following relation:

$$\Delta T_{az} = r_w m \left[ \frac{[V_c - V_f(x_{crit})]}{[t_c + t_f(x_{crit}) - \beta t^*_{min}]} - \frac{1}{x_N} \sum_{i=0}^{N-1} a_i \Delta x_i \right]$$

Where:
- $\Delta T_{az}$ = Change in axle torque to meet auto-following distance constraints.
- $V_c$ = Current driven vehicle spped
- $V_f(x_{crit})$ = Followed vehicle speed at distance $x_{crit}$
- $t_c$ = Current following time
- $t_f(x_{crit})$ = Time for followed vehicle to reach distance $x_{crit}$
- $a_i$ = Driven vehicle acceleration at index $i$.
- $\Delta x_i$ = Incremental distance between cell $i$ and $i+1$
- $r_w$ = is wheel/tire rolling radius in m.
- $m$ = is vehicle mass in kg.

Given this new axle torque command, re-compute the projected speed tables and time/distance tables for the driven and followed vehicles.

In the next loop cycle

FIG. 10B

AUTOMATIC FOLLOWING DISTANCE IN CRUISE CONTROL

INTRODUCTION

The present disclosure relates to a method and system for cruise control and, more particularly, to a cruise control method and systems for automatically maintaining a following distance (or following time) between a driven vehicle and a followed vehicle.

Cruise control is currently calibrated to rigidly control a driver's set speed and can be aggressive and inefficient in its attempt to maintain the set speed on changes in road grades. Further, the cruise control algorithm is automatically aborted during adaptive headway control to avoid contact with another vehicle. This leads to lower fuel economy and unnatural behavior (e.g., aggressive tip-ins and downshifts while going up hills, riding the brakes down hills, etc.).

SUMMARY

To improve fuel economy, the presently disclosed cruise control method and systems consider and synthesize elevation data and forward camera (or radar) data to compute upcoming trajectories for the driven vehicle, and the followed vehicle (i.e., the vehicle directly in front of the driven vehicle). These trajectories are analyzed, and the vehicle axle torque is adjusted to deliver maximum steady state operation, while not violating a minimum, safe following distance (or following time) to the vehicle in front.

In an aspect of the present disclosure, a cruise control method to control a driven vehicle includes: receiving, by a controller of the driven vehicle, a set speed, a minimum allowed speed, and a maximum allowable speed; commanding, by the controller, a propulsion system to produce a commanded axle torque to maintain the set speed; monitoring a current speed of the driven vehicle; monitoring an elevation of a terrain at predetermined-upcoming locations of the driven vehicle; determining projected speeds of the driven vehicle at each of the predetermined-upcoming locations using the current speed of the driven vehicle and the elevation of the terrain at the predetermined-upcoming locations; monitoring a current speed of a followed vehicle, wherein the followed vehicle is driving directly in front of the driven vehicle; determining projected speeds of the followed vehicle at each of the predetermined-upcoming locations using the current speed of the followed vehicle and the elevation of the terrain at the predetermined-upcoming locations; determining a plurality of following times at each of the predetermined-upcoming locations using the projected speeds of the driven vehicle and the projected speeds of the followed vehicle, wherein each of the plurality of following times is a time required for the driven vehicle to reach the followed vehicle; comparing each of the plurality of following times with a predetermined-minimum time threshold; determining whether at least one of the plurality of following times is less than the predetermined-minimum time threshold; and in response to determining that at least one plurality of following times is less than the predetermined-minimum time threshold, commanding, by the controller, the propulsion system of the driven vehicle to decrease the commanded axle torque by a torque adjustment in order to prevent each of the plurality of following times at each of the predetermined-upcoming locations from being less than the predetermined-minimum time threshold.

In an aspect of the present disclosure, the cruise control method further comprises generating a projected-speed table using the projected speeds of the driven vehicle at each of the predetermined-upcoming locations of the driven vehicle. The driven vehicle includes a user interface configured to allow a user to set the maximum allowable speed, and the minimum allowable speed.

In an aspect of the present disclosure, the cruise control method further comprises generating a table of times required for the driven vehicle to reach each of the predetermined-upcoming locations using the projected-speed table.

In an aspect of the present disclosure, the cruise control method further comprises generating a table of the times required for the followed vehicle to reach each of the predetermined-upcoming locations.

In an aspect of the present disclosure, the times required for the followed vehicle to reach each of the predetermined-upcoming locations is determined using the projected speeds of the followed vehicle at each of the predetermined-upcoming locations, a vehicle acceleration of the followed vehicle, and an initial distance between the driven vehicle and the followed vehicle at a first one of the predetermined-upcoming locations.

In an aspect of the present disclosure, the cruise control method further comprises determining a speed of the followed vehicle, the vehicle acceleration of the followed vehicle, and the initial distance between the driven vehicle and the followed vehicle at the first one of the predetermined-upcoming locations using one or more radars of the driven vehicle.

In an aspect of the present disclosure, the cruise control method further comprises determining a difference between the times required for the driven vehicle to reach each of the predetermined-upcoming locations using the projected-speed table and the times required for the followed vehicle to reach each of the predetermined-upcoming locations to determine each of the plurality of following times.

In an aspect of the present disclosure, the cruise control method further comprises, in response to determining that each of the plurality of following times is equal to or greater than the predetermined-minimum time threshold, commanding, by the controller, the propulsion system of the driven vehicle to maintain the commanded axle torque.

In an aspect of the present disclosure, the cruise control method further comprises determining the torque adjustment. The predetermined-minimum time threshold is equal to a minimum following time times a first safety factor. The torque adjustment is a function of a current speed of the driven vehicle, a current speed of the followed vehicle, and a vehicle acceleration of the driven vehicle at the predetermined-upcoming locations.

In an aspect of the present disclosure, the torque adjustment is calculated using the following equation:

$$\Delta \tau_{az} = r_w m \left[ \frac{[v_c - v_{f(x_{crit})}]}{[t_c + t_{f(x_{crit})} - \beta t^*_{min}]} \right] - \frac{1}{x_N} \sum_{i=0}^{N-1} a_i \Delta x_i$$

where:

$\Delta \tau_{az}$ is a change in axle torque to meet a plurality of auto-following distance constraints;

$v_c$ is the current speed of the driven vehicle;

$v_{f(x_{crit})}$ is a speed of the followed vehicle at a distance $x_{crit}$;

$x_{crit}$ is a distance at which a violation of the predetermined-minimum time threshold occurs;

$t_c$ is a current following time;

$t_{f(x_{crit})}$ is a time required for the followed vehicle to reach the distance $x_{crit}$;

$a_i$ is a vehicle acceleration of the driven vehicle an index i.

$\Delta x_i$ is an incremental distance between cells i and cell i+1;

$r_w$ is a rolling radius of a wheel of the driven vehicle in millimeters; and m is a mass of the driven vehicle in kilograms;

β is a second safety factor that is greater than the first safety factor in order to avoid violating the predetermined-minimum time threshold; and $t_{min}$* is the predetermined-minimum time threshold.

The present disclosure also describes a vehicle system including a propulsion system and a controller in communication with the propulsion system. The controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 3 is a schematic illustration of an elevation look-ahead table representing the elevation of the terrain at the predetermined-upcoming locations of the vehicle system.

FIG. 4 is a schematic illustration of a projected-speed table including the projected speeds of the vehicle system at each of the predetermined-upcoming locations of the vehicle system.

FIG. 5 is a schematic illustration of an updated, projected-speed table.

FIG. 6 is a schematic illustration of a following times table.

FIG. 7 is a schematic illustration of an updated following time table.

FIG. 10B is a second part of a headway control process of the method of FIG. 8.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
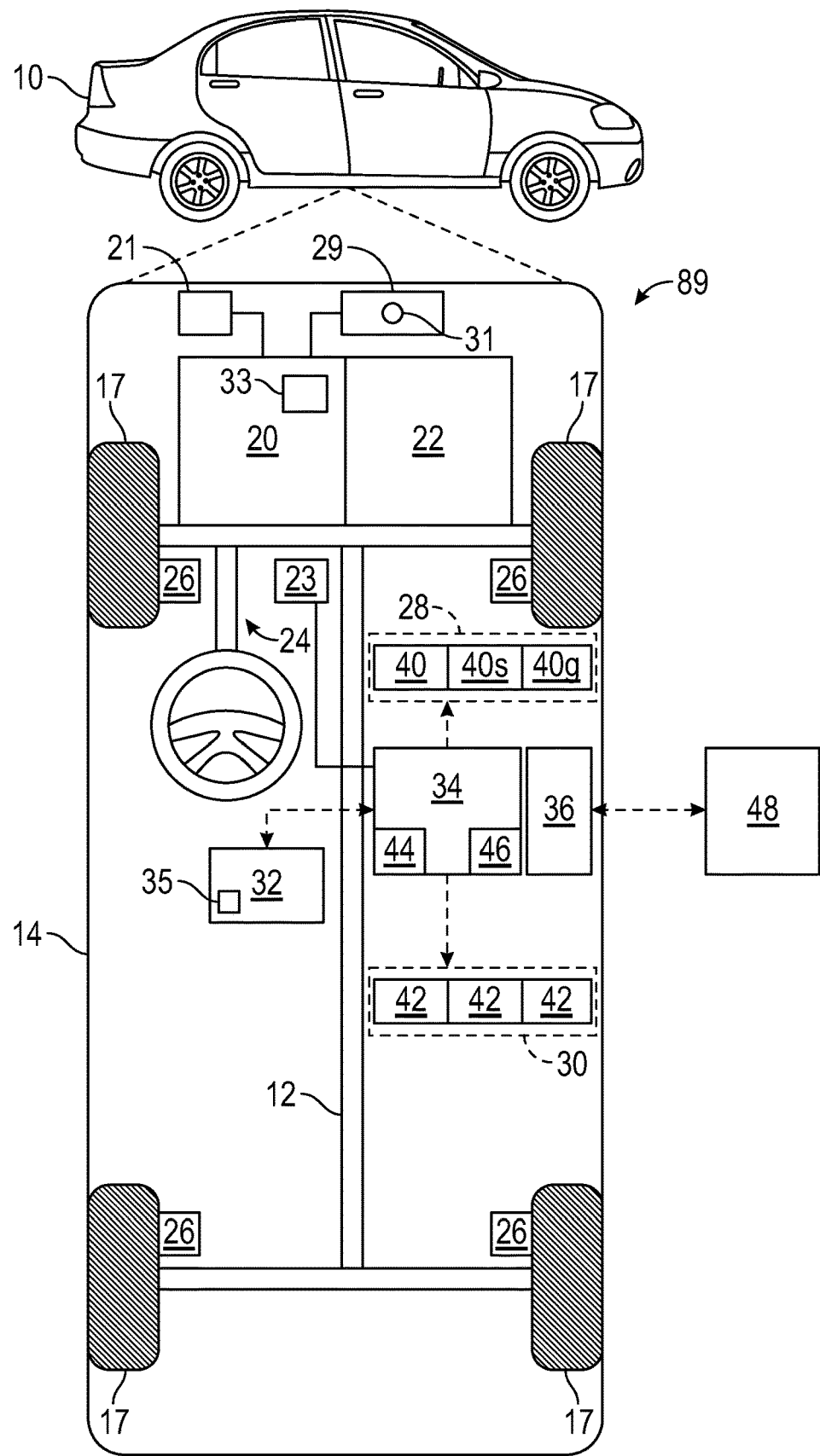
FIG. 1 is a schematic block diagram of a vehicle.

As depicted in FIG. 1, a driven vehicle 10 generally includes a chassis 12, a body 14, front and rear wheels 17 and may be referred to as the host vehicle. The vehicle 10 may be referred to as a motor vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

The driven vehicle 10 may be an autonomous vehicle, and a control system 89 is incorporated into the driven vehicle 10. The control system 89 may alternatively be referred to as a vehicle system. The driven vehicle 10 is, for example, a vehicle that is automatically controlled to carry passengers from one location to another. The driven vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. The vehicle 10 may be a so-called Level Four or Level Five automation system. A Level Four system indicates "high automation", referring to the driving mode-specific performance by an automated driving system of the aspects of the dynamic driving task, even if a human driver does not respond appropriately to a request to intervene. A Level Five system indicates "full automation", referring to the full-time performance by an automated driving system of the aspects of the dynamic driving task under different roadway and environmental conditions that can be managed by a human driver.

The driven vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may include an electric machine such as a traction motor and/or a fuel cell propulsion system. The driven vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine 33 having a plurality of cylinders. When the propulsion system 20 engages active fuel management (AFM), not all of the cylinders of the internal combustion engine 33 are active. Conversely, when the propulsion system disengages AFM, all of the cylinders of the internal combustion engine 33 are active. The transmission system 22 is configured to transmit power from the propulsion system 20 to the vehicle wheels 17 according to selectable speed ratios. The transmission system 22 may include a step-ratio automatic transmission, a continuously variable transmission, or other appropriate transmission. The brake system 26 is configured to provide braking torque to the vehicle wheels 17. The brake system 26 may include friction brakes, brake by wire, a regenerative braking system such as an electric machine, and/or other appropriate braking systems. The steering system 24 influences a position of the vehicle wheels 17. While depicted as including a steering wheel for illustrative purposes, the steering system 24 may not include a steering wheel. The vehicle 10 may include an air-conditioning system 29 with a compressor 31 coupled to the internal combustion engine 33 of the propulsion system 20. The compressor 31 may be driven by the internal combustion engine 33.

The sensor system 28 includes one or more sensing devices 40 that sense observable conditions of the exterior environment and/or the interior environment of the vehicle 10. The sensing devices 40 may include, but are not limited to, radars, lidars, global positioning systems, optical cameras (e.g., forward-looking cameras), thermal cameras, ultrasonic sensors, clocks for measuring time, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 28 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 may be a custom made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The data storage device 32 and/or the computer readable storage device or media 46 may include a map database 35. In the present disclosure, the term 'map database" means a database that stores geographical and topographical data, such as roads, streets, cities, parks, traffic signs, elevation information, two-dimensional or three-dimensional arrangement of objections with attributes to location and category. The map database 35 includes data about the elevation E of a terrain Trr (FIGS. 3, 6, and 7) at predetermined-upcoming locations of the vehicle 10. The data about the elevation E of a terrain Trr (FIG. 3) at the predetermined-upcoming locations of the vehicle 10 is referred to herein as upcoming elevation data ED. In the present disclosure, the terrain Trr is the terrain Trr in which the vehicle 10 is traveling or will be traveling. The map database 35 may alternatively be referred to as the map module.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 89. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger).

Figure 2:
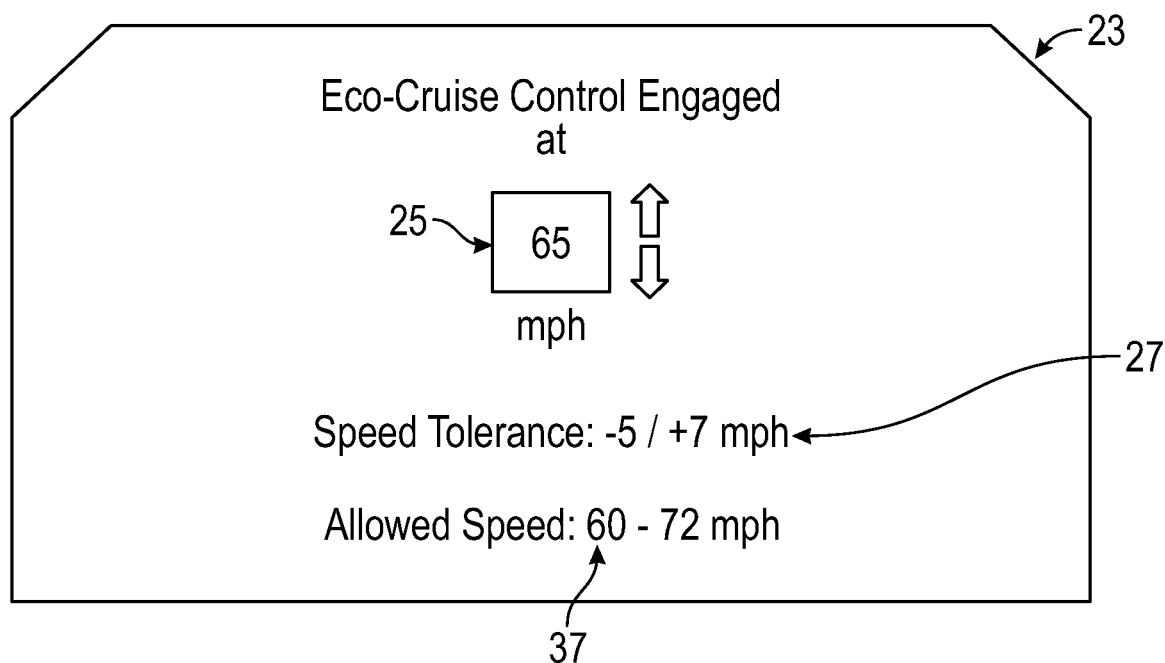
FIG. 2 is a schematic diagram of part of a user interface of the vehicle of FIG. 1.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). The followed vehicle 11 may communicate relevant information (i.e., a speed, acceleration and/or location of the followed vehicle 11) to the driven vehicle via V2V communication. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 89, which is configured to control the driven vehicle 10. The controller 34 of the control system 89 is in electronic communication with the braking system 26, the propulsion system 20, and the sensor system 28. The braking system 26 includes one or more brake actuators (e.g., brake calipers) coupled to one or more wheels 17. Upon actuation, the brake actuators of the braking system 26 apply braking pressure on one or more wheels 17 to decelerate the driven vehicle 10. The propulsion system 20 includes one or more propulsion actuators for controlling the propulsion of the driven vehicle 10. For example, as discussed above, the propulsion system 20 may include internal combustion engine 33 and, in that case, the propulsion actuator of the propulsion system 20 may be a throttle specially configured to control the airflow in the internal combustion engine 33. The sensing devices 40 (i.e., sensors) of the sensor system 28 may include one or more accelerometers (or one or more gyroscopes) coupled to one or more wheels 17. The accelerometer is in electronic communication with the controller 34 and is configured to measure and monitor the longitudinal and lateral accelerations of the driven vehicle 10. The sensor system 28 may include one or more speed sensors 40s configured to measure and monitor the speed (or velocity) of the driven vehicle 10. The speed sensor 40s is coupled to the controller 34 and is in electronic communication with one or more wheels 17. The sensor systems 28 may include one or more radars and/or forward-looking cameras to measure the distance between the driven vehicle 10 and a followed vehicle 11. Thus, the sensing devices 40 may be radars and/or forward-looking cameras. The radars and/or forward-looking cameras may also be used to determine the speed and/or acceleration of the followed vehicle 11. In the present disclosure, the followed vehicle 11 is a vehicle that is directly in front of the driven vehicle. As a result, no other vehicle is between the driven vehicle 10 and the followed vehicle 11. Accordingly, the controller 34 is programmed to monitor the speed and/or acceleration of the driven vehicle 10 based on the input from the sensor system 28. Further, the controller 34 is programmed to monitor and determine the speed and/or acceleration of the followed vehicle 11 based on the input from the sensor system 28. Additionally, the controller 34 is programmed to monitor and determine the distance from the driven vehicle 10 to the followed vehicle 11 based on the input from the sensor system 28.

FIG. 2 is a schematic diagram of part of the user interface 23. The vehicle 10 has cruise control, and the driver's set speed 25 (shown in the user interface 23) can be adjusted by the driver with, for example, up/down arrows on the steering wheel of the vehicle 10. Aside from the driver's set speed 25, the user interface 23 also shows the speed tolerance 27, which includes a maximum allowed speed and a minimum allowed speed. The driver may adjust the maximum allowed speed and and/or minimum allowed of the speed tolerance using the user interface 23. The user interface 23 shows the allowed speed range 37, which is calculated as a function of the set speed, the maximum allowed speed, and the minimum allowed speed. The maximum allowed speed and the minimum allowed speed are each a speed boundary of an allowed speed range 37.

With reference to FIG. 3, the present disclosure describes a cruise control method 100 (FIG. 6) that uses upcoming elevation data ED in order to understand in advance when steady-state cruise control operation will lead to a speed violation (drifting outside the driver's bounds). The driven vehicle 10 can then prepare for the upcoming violation and will adjust torque command at opportunistic moments (in efficient ways) using this understanding of the terrain Trr ahead. To do so, the controller 34 receives and monitors the elevation data ED about the upcoming terrain Trr from the map database 35 and/or vehicle sensors/cameras (e.g., a sensor system 28). As discussed above, the data about the elevation E of a terrain Trr (FIG. 3) at predetermined-upcoming locations of the vehicle 10 is referred herein as upcoming elevation data ED. Using this upcoming elevation data, the controller 34 then generates an elevation look-ahead table. The elevation look-ahead table EDT includes a plurality of look-ahead elevation points. The look-ahead elevation points are equidistant from each other. In other words, the look-ahead points are separated from each other by a predetermined distance, and the first look-ahead point is separated from the current location of the driven vehicle 10 by the same predetermined distance.

With reference to FIG. 4, the controller 34 determines (i.e., calculates) a projected speed of the driven vehicle 10 at each look-ahead elevation point. In other words, the controller 34 is programmed to determine the projected speeds of the driven vehicle 10 at each of the predetermined-upcoming locations of the driven vehicle 10 as a function of the current speed of the driven vehicle 10 and the elevation E of the terrain Trr at the predetermined-upcoming locations of the driven vehicle 10. Then, the controller 34 generates a projected-speed table PST using the projected speeds PS of the vehicle 10 at each of the predetermined-upcoming locations of the driven vehicle 10. Next, the controller 34 determines whether there is a speed violation V. In other words, the controller 34 determines whether one or more of the projected speeds is outside the allowed speed range 37 (FIG. 2).

With reference to FIG. 5, after identifying a speed violation V, the controller 34 computes the necessary increase in initial torque to accommodate the elevation change, resulting in meeting the speed allowed range 37 (FIG. 2). The increase in computed axle torque results in new projected speed profile for the same elevation, now allowing speed deviation allowance to be met. In other words, the controller 34 generates an updated, projected-speed table UPST based in the increased, computed axle torque as discussed in detail below.

With reference to FIG. 6, as discussed below, the cruise control method 100 (FIG. 8) entails determining the following time (in seconds) between the driven vehicle 10 and the followed vehicle 11 at each predetermined-upcoming locations. The controller 34 then generates a following time table FTT. In the present disclosure, the term "following time" means a time required for the driven vehicle 10 to reach and come in contact with the followed vehicle 11. As discussed above, the followed vehicle 11 is directly in front of the driven vehicle 10 in open-road conditions and no other vehicle is between the driven vehicle 10 and the followed vehicle 11. The following time table FTT includes the following times (in seconds) at each predetermined-upcoming locations. The predetermined-upcoming locations may be referred to as distance $x_i$. The predetermined-upcoming locations (i.e., distance $x_i$) correspond to the predetermined-upcoming locations in tables shown in FIGS. 3, 4, and 5. The following times at each predetermined-upcoming locations should be less than a predetermined-minimum time threshold in order to prevent the driven vehicle 10 from coming into contact with the followed vehicle 11.

With continued reference to FIG. 6, to generate the following time table FTT, the controller 34 generates a first distance table FDT. The first distance table FDT includes the time required for the driven vehicle 10 to reach each predetermined-upcoming location (i.e., distance $x_i$). The time required for the driven vehicle 10 to reach each predetermined-upcoming location may be calculated using the projected-speed table PST (FIG. 4) or the updated, projected-speed table UPST (FIG. 5) if the commanded axle torque has been adjusted. The controller 34 also generates a second distance table SDT. The second distance table SDT includes the time required for the followed vehicle 11 to reach each predetermined-upcoming location (i.e., distance $x_i$). To do so, the controller 34 may determine the current speed and acceleration of the followed vehicle 11 using the sensing devices 40 (e.g., forward-looking camera and/or radar) and/or information transmitted from the followed vehicle 11 to the driven vehicle 10 via V2V communications. Using the current speed and the current acceleration of the followed vehicle 11, the controller 34 determines the projected speeds of the followed vehicle 11 at each predetermined-upcoming location (i.e., distance $x_i$). Then, using the projected speeds of the followed vehicle 11 at each predetermined-upcoming location (i.e., distance $x_i$), the acceleration of the followed vehicle 11 and the initial following distance from the driven vehicle 10 to the followed vehicle 11, the controller 34 determines the time required for the followed vehicle 11 to reach each predetermined-upcoming location (i.e., distance $x_i$) and generates the second distance table SDT.

With continued reference to FIG. 6, then, for all the points in the first distance table FDT and the second distance table SDT where the distance $x_i$ is less than a predetermined calibratable distance, the controller 34 calculates the difference between the time required for the driven vehicle 10 to reach each of the predetermined-upcoming locations (as shown in the first distance table FDT) and the time required for the followed vehicle 11 to reach each of the predetermined-upcoming locations to determine each of the plurality of following times at each predetermined-upcoming location, thereby generating the following time table FTT. Next, controller 34 then reads at the following time table FTT to identify a following time violation FTV. The following distance time violation FTV occurs solely when one of the following times at the predetermined-upcoming location is less than a predetermined-minimum time threshold. For example, the predetermined-minimum time threshold may be 0.8 seconds, and the controller 34 may identify a following distance time violation FTV solely when one or more of the following times in the following time table FTT is less than 0.8 seconds.

With reference to FIG. 7, in response to determining that at least one plurality of following times is less than the predetermined-minimum time threshold, the controller 34 commands the propulsion system 20 of the driven vehicle 10 to decrease the commanded axle torque by a torque adjustment in order to prevent each of the plurality of following times at each of the predetermined-upcoming locations from being less than the predetermined-minimum time threshold. Then, the controller 34 generates an updated-first distance table UFDT, updated-second distance table USDT, and a UFTT to determine whether any of the updated following times is less than the predetermined-minimum time threshold.

Figure 8:
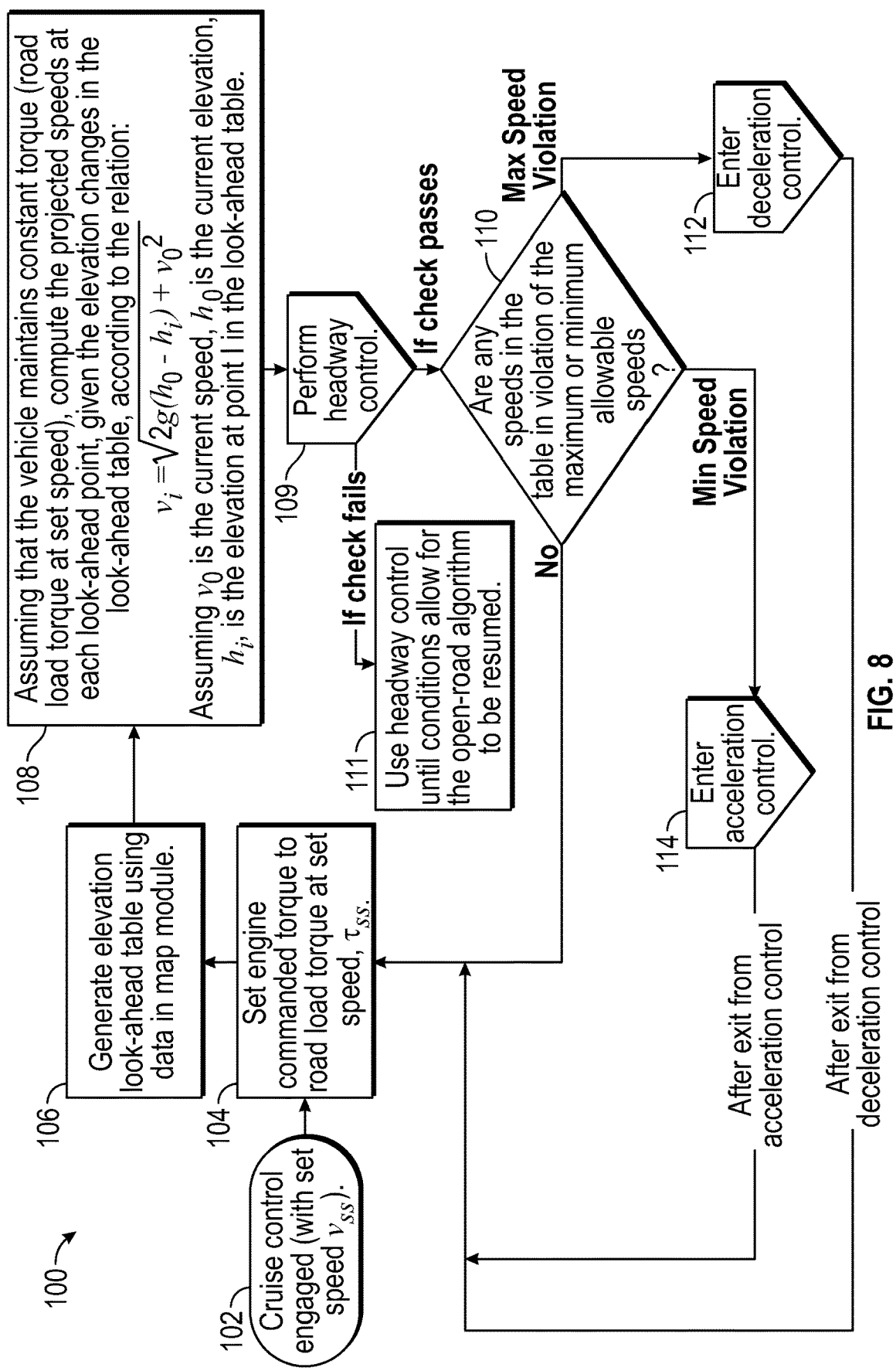
FIG. 8 is a flowchart of a method for controlling the cruise control of the vehicle system of FIG. 1 to optimize fuel economy.

FIG. 8 is a flowchart of a cruise control method 100 for controlling the cruise control of the driven vehicle 10 of FIG. 1 to optimize fuel economy. The method 100 begins at block 102. At block 102, the controller 34 determines that the cruise control has been engaged by the vehicle operator of the driven vehicle 10. The vehicle operator may engage the cruise control through the user interface 23. For instance, the vehicle operator may press a button on the user interface 23 to engage the cruise control. At block 102, the vehicle operator may also set the set speed $v_{ss}$, the maximum allowed speed $v_{max}$, and the minimum allowed speed $v_{min}$ through the user interface 23 by, for example, pressing up/down arrows on the steering wheel of the vehicle 10. Thus, at block 102, the controller 34 receives the set speed $v_{ss}$, the maximum allowed speed $v_{max}$, and the minimum allowed speed $v_{min}$ from the user interface 23. As discussed above, each of the maximum allowed speed $v_{max}$ and the minimum allowed speed $v_{min}$ is a speed boundary of the allowed speed range 37. At block 102, the controller 34 also determines and monitors (in real time) the current vehicle speed v based on the inputs of the speed sensor 40s. After block 102, the method 100 proceeds to block 104.

At block 104, the controller 34 sets the commanded axle torque $\tau_{ss}$ to road load torque at the set speed $v_{ss}$. To do so, the controller 34 commands the propulsion system 20 to produce the commanded axle torque $\tau_{ss}$ in order to maintain the set speed $v_{ss}$. Then, the method 100 continues to block 106.

At block 106, the controller 34 also determines and monitors the elevation E of the terrain Trr at predetermined-upcoming locations of the vehicle 10 using the upcoming elevation data of the map database 35. Also, the controller 34 generates the elevation look-ahead table EDT (FIG. 3) using the elevation E of the terrain Trr at the predetermined-upcoming locations of the vehicle 10. As discussed above, the elevation look-ahead table EDT (FIG. 3) includes a plurality of look-ahead elevation points, which correspond to the predetermined-upcoming locations of the driven vehicle 10. The controller 34 uses upcoming elevation data ED from the map database 35 to generate the elevation look-ahead table EDT. Therefore, block 106 also entails retrieving elevation data ED from the map database 35 and then using the upcoming elevation data ED to generate the elevation look-ahead table EDT. The look-ahead elevation points of the elevation look-ahead table EDT are equidistant from each other. In other words, the look-ahead points are separated from each other by a predetermined distance, and the first look-ahead point is separated from the current location of the vehicle 10 by the same predetermined distance. Then, the method 100 proceeds to block 108.

At block 108, the controller 34 determines projected speeds of the vehicle at each of the predetermined-upcoming locations of the vehicle as a function of the current speed $v_0$ of the driven vehicle 10 and the elevation E of the terrain Trr at the predetermined-upcoming locations of the driven vehicle 10. To do so, the controller 34 assumes the driven vehicle 10 maintains a constant torque (i.e., road load torque at set speed $v_{ss}$) and calculates the projected speeds at each look-ahead point in the elevation table EDT (given the changes in elevation in the elevation table EDT) with the following equation:

$$v_i = \sqrt{2g(h_0 - h_i) + v_0^2}$$

where $v_0$ is the current speed of the vehicle 10;

$h_0$ is the current elevation of the terrain Trr at the current location of the vehicle 10;

$h_i$ is the elevation at point i in the elevation look-ahead table EDT;

g is the gravitational acceleration; and $v_i$ is the projected speed at point i in the elevation look-ahead table EDT.

Using the equations above, the controller 34 calculates the projected speed at each look-ahead point and generates the projected-speed table PST (FIG. 4) using the projected speeds of the vehicle 10 at each of the predetermined-upcoming locations of the vehicle 10. After block 108, the method 100 proceeds to block 109.

Figure 10A:
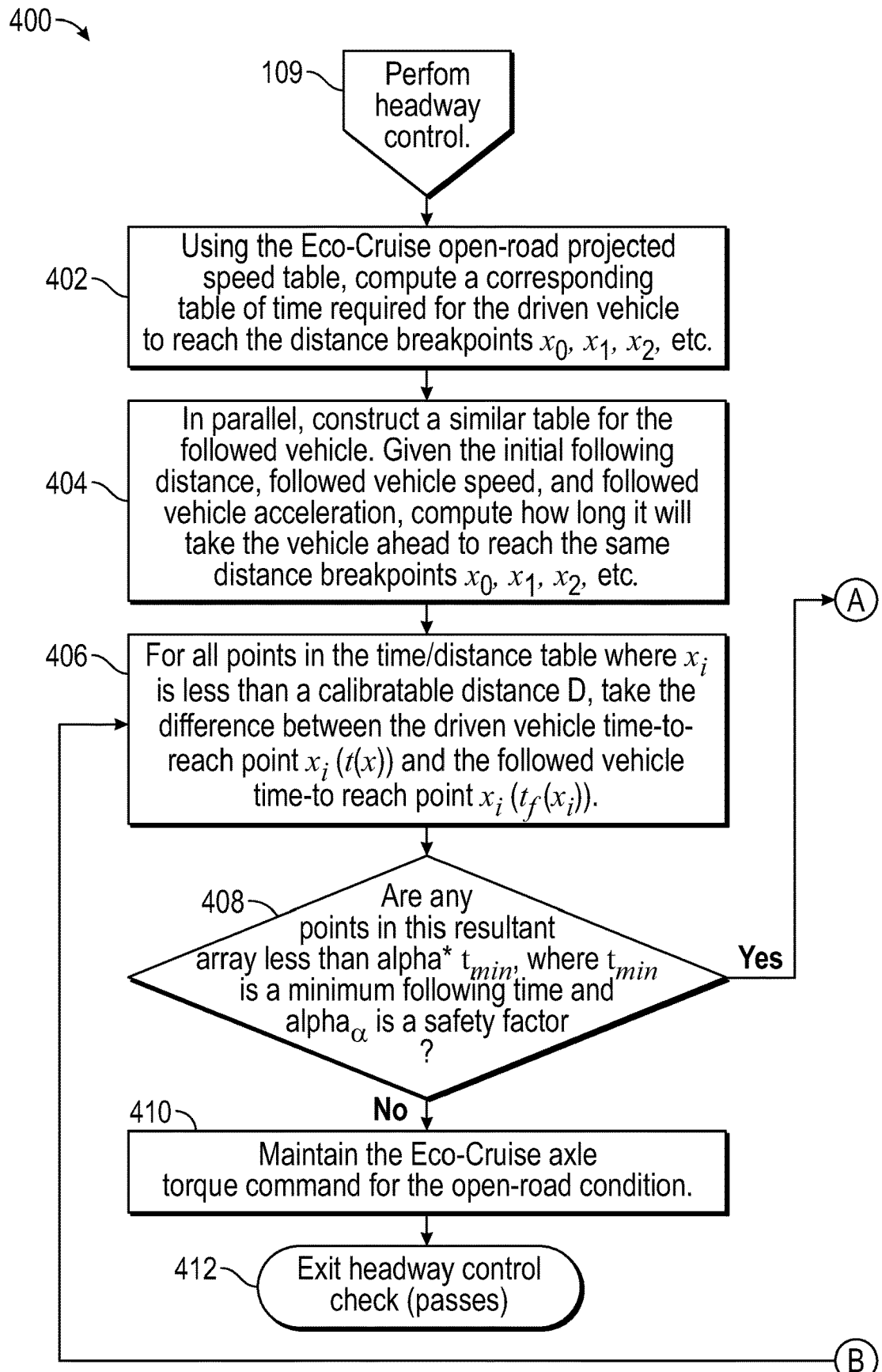
FIG. 10A is a first part of a headway control process of the method of FIG. 8.

At block 109, the controller 34 executes a headway control algorithm 400 (FIGS. 10A and 10B). The headway control algorithm 400 (FIGS. 10A and 10B) determines whether the following times (between the driven vehicle 10 and the followed vehicle 11) at predetermined-upcoming locations is less than the predetermined-minimum time threshold. If any of the following times at the predetermined-upcoming locations is less than the predetermined-minimum time threshold, then the method 100 proceeds to block 111. At block 111, the controller 34 executes the headway control algorithm 400 (FIGS. 10A and 10B) until the conditions allow for the open-road algorithm to be resumed. The open-road algorithm refers to the cruise control method 100, except for block 111, and the conditions that allow for the open-road algorithm to be resumed refer to the following times at the predetermined-upcoming locations being equal to or greater than the predetermined-minimum time threshold. Thus, once the conditions allows for the open-road algorithm to be resumed, the method 100 returns to block 104. If, at block 109, the following times at the predetermined-upcoming locations being equal to or greater than the predetermined-minimum time threshold, then the method 100 proceeds to block 110.

At block 110, the controller 34 compares each of the projected-speeds at each of the predetermined-upcoming locations with the allowed speed range 37 to determine whether any of the projected speeds is outside the allowed speed range 37. In other words, at block 110, the controller 34 determines whether there are any projected speeds in the projected-speed table PST (FIG. 4) is in violation of the maximum allowed speed $v_{max}$ and/or the minimum allowed speed $v_{min}$. If there are no projected speeds that are in violation of the maximum allowed speed $v_{max}$ and/or the minimum allowed speed $v_{min}$, the method 100 returns to block 104. If there are projected speeds that are in violation of the maximum allowed speed $v_{max}$, the controller 34 begins the deceleration control process 300 (FIGS. 8A, 8B, 8C, and 8D) at block 112. In the deceleration control process 300, the controller 34 commands the propulsion system 20 of the vehicle 10 to adjust the commanded axle torque to maintain the actual speed of the vehicle 10 within the allowed speed range 37 at each of the predetermined-upcoming locations. After executing the deceleration control process, the method 100 proceeds to returns to block 104. If there are projected speeds that are in violation of the minimum allowed speed $v_{min}$, the controller 34 begins the acceleration control process 200 (FIGS. 7A, 7B, and 7C) at block 114. In the acceleration control process 200, the controller 34 commands the propulsion system 20 of the vehicle 10 to adjust the commanded axle torque to maintain the actual speed of the vehicle 10 within the allowed speed range 37 at each of the predetermined-upcoming locations. After executing the acceleration control process, the method 100 returns to block 104.

Figure 8A:
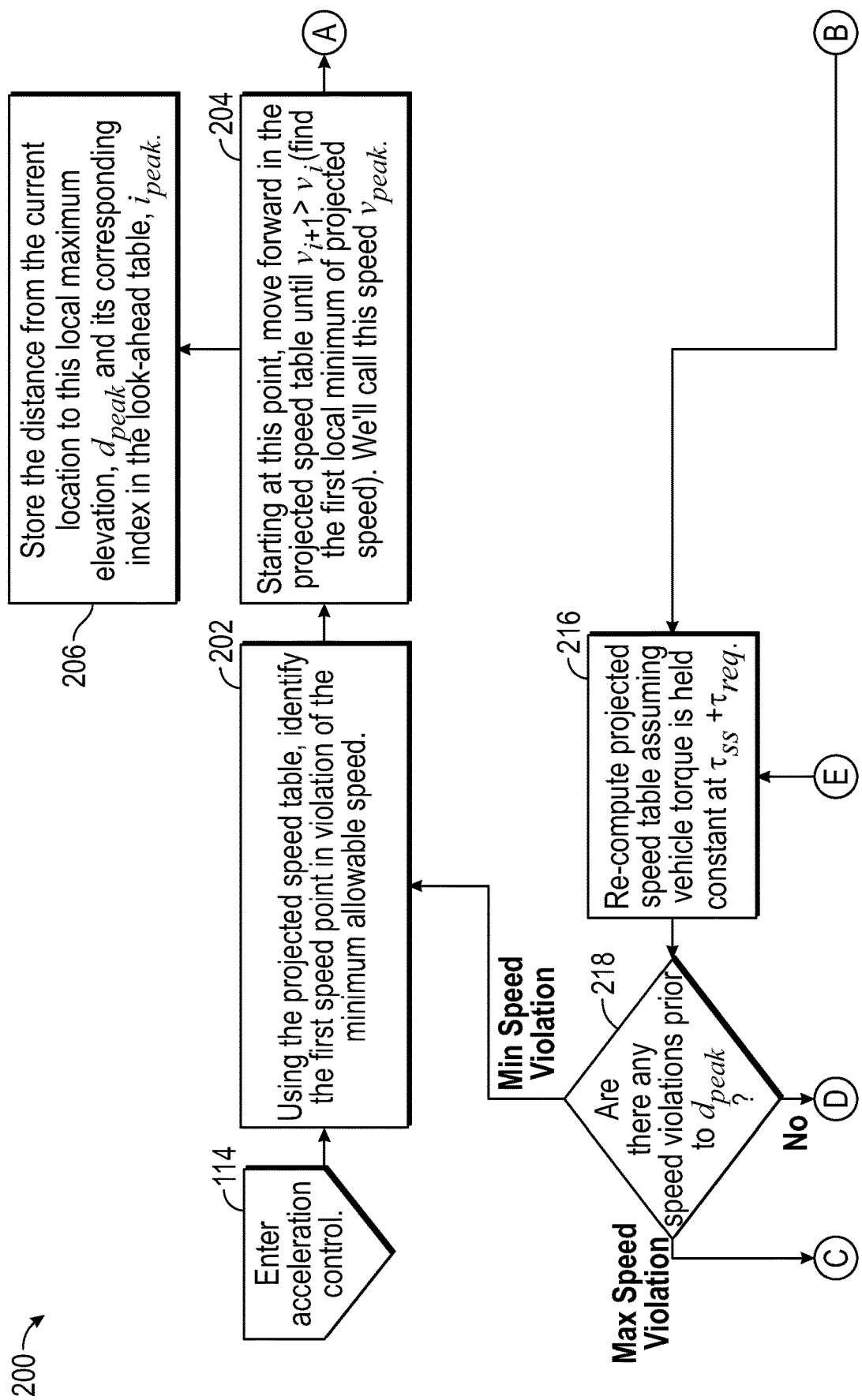
FIG. 8A is a first part of an acceleration control process of the method of FIG. 6.
Figure 8B:
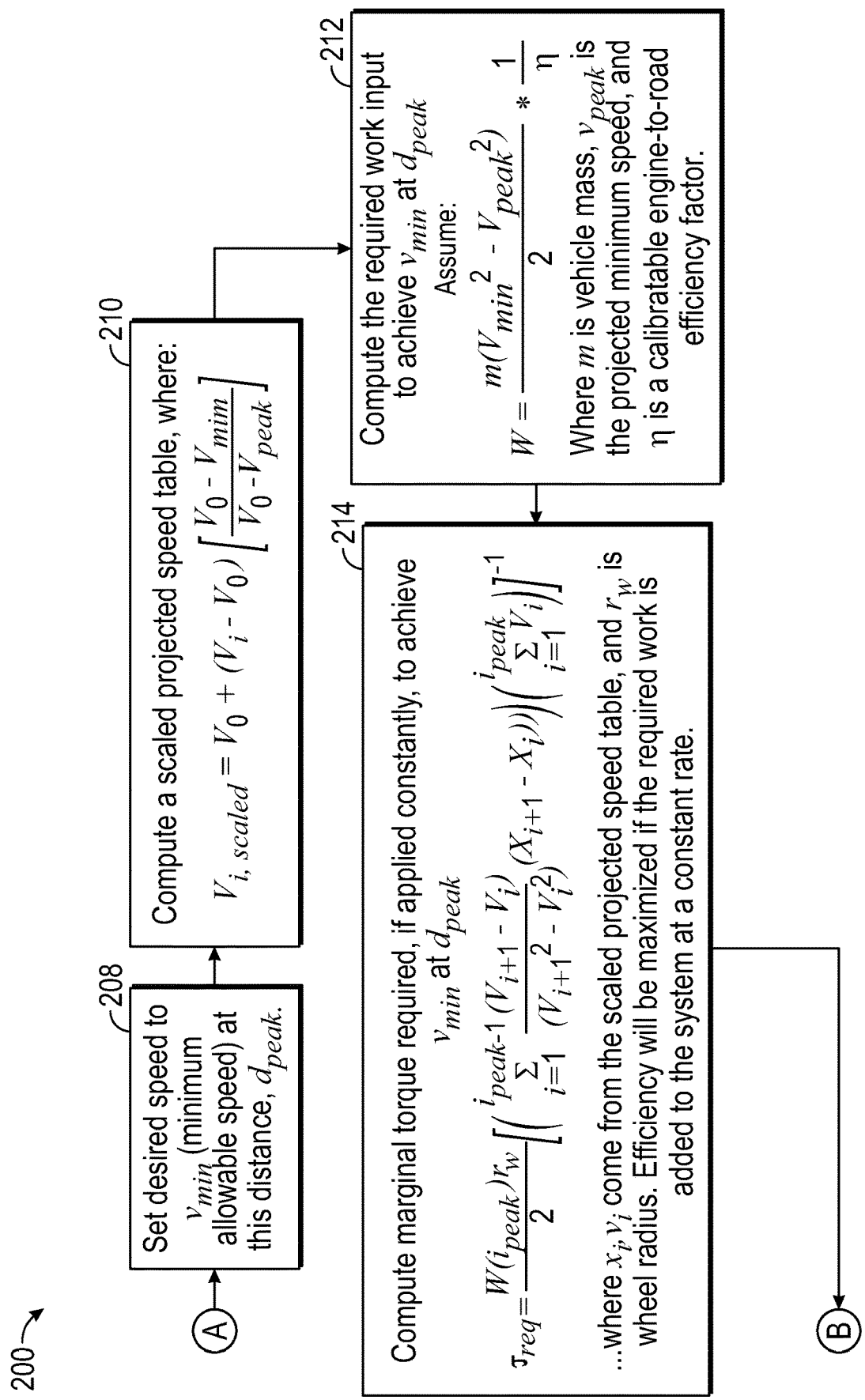
FIG. 8B is a second part of the acceleration control process of the method of FIG. 8.
Figure 8C:
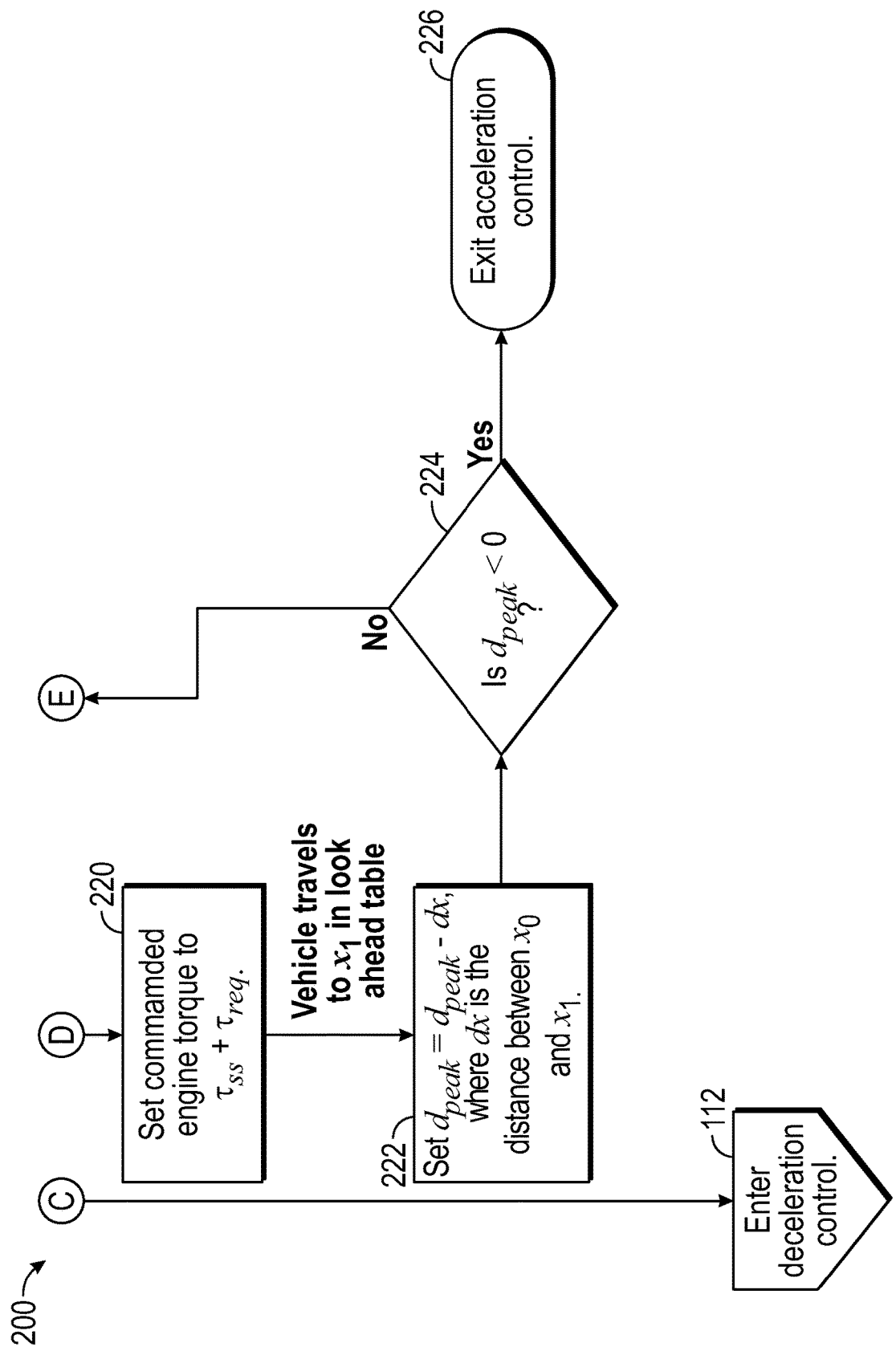
FIG. 8C is a third part of the acceleration control process of the method of FIG. 8.
Figure 9A:
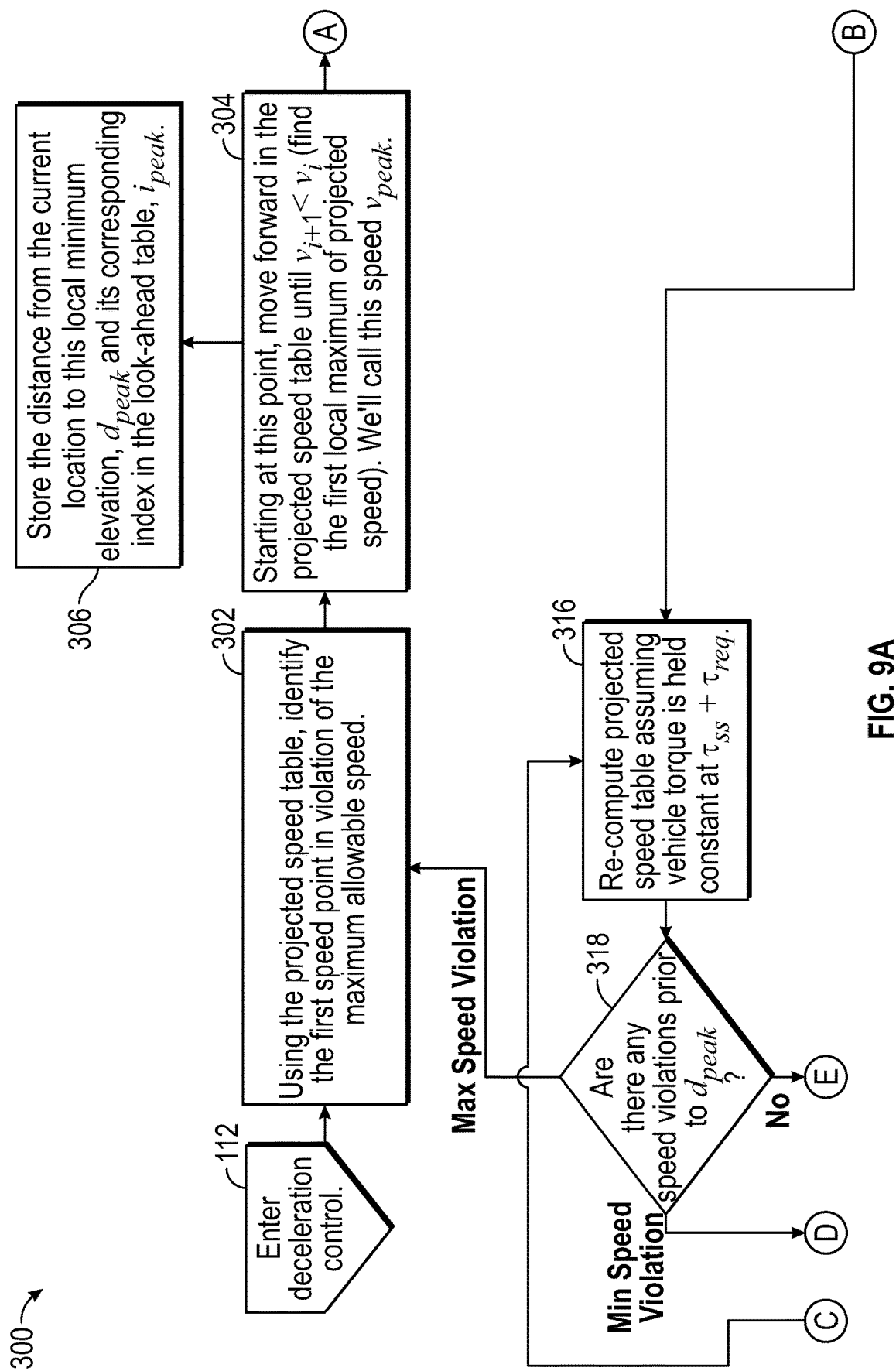
FIG. 9A is a first part of a deceleration control process of the method of FIG. 8.
Figure 9B:
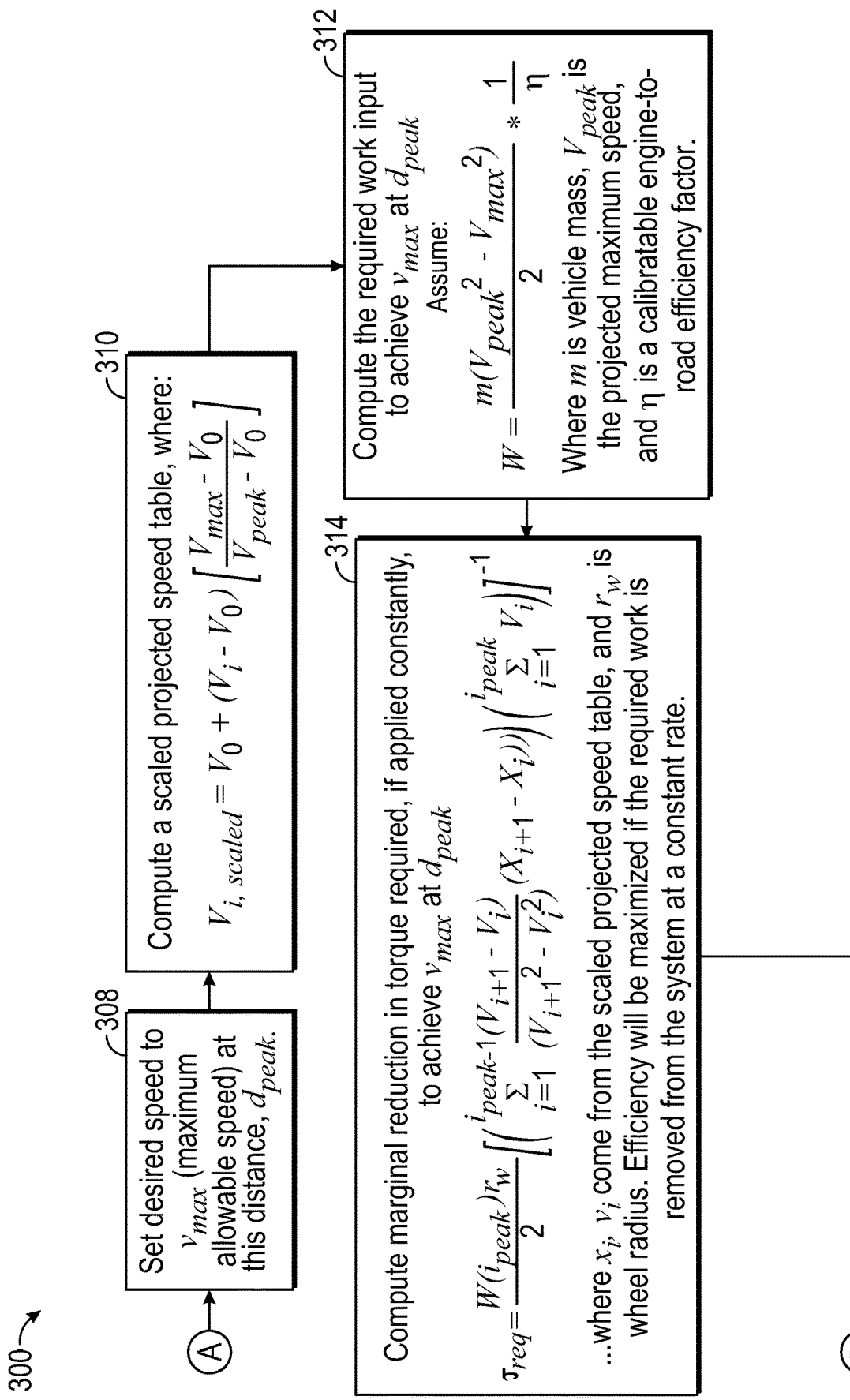
FIG. 9B is a second part of the deceleration control process of the method of FIG. 8.
Figure 9C:
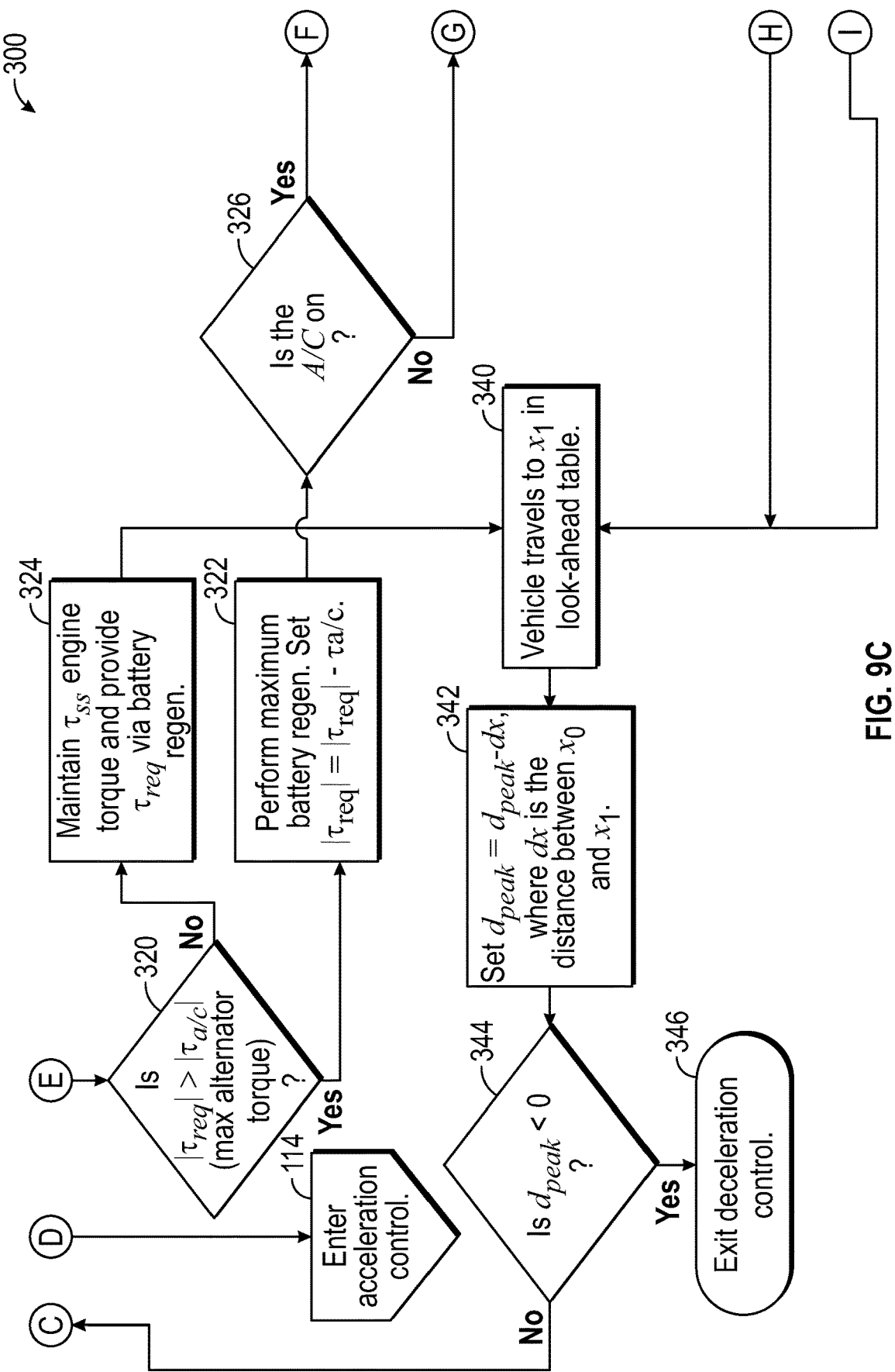
FIG. 9C is a third part of the deceleration control process of the method of FIG. 8.
Figure 9D:
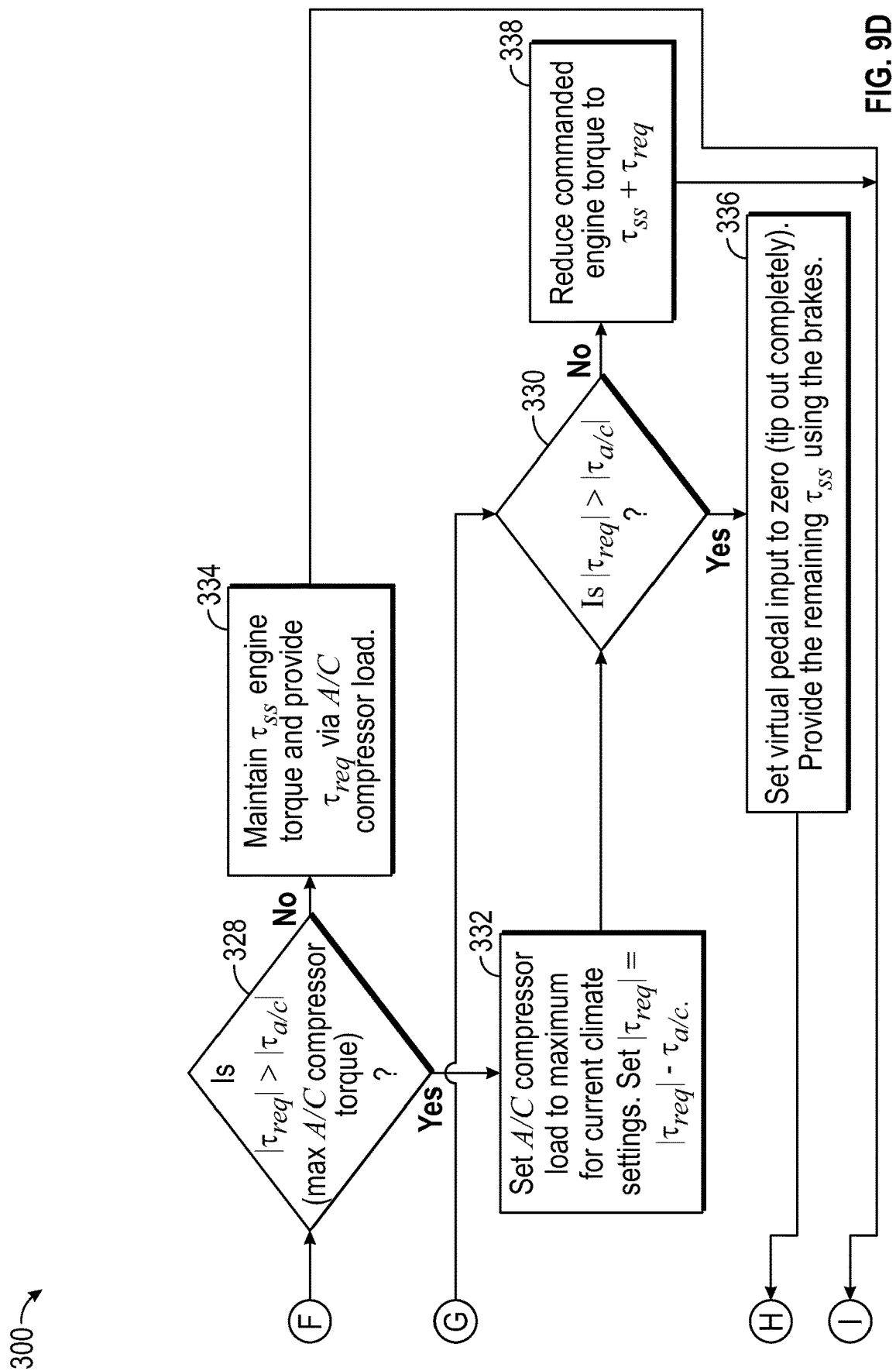
FIG. 9D is a fourth part of the deceleration control process of the method of FIG. 8.

FIGS. 8A, 8B, and 8C illustrate the acceleration control process 200. At block 114 (as discussed above), the controller 34 enters acceleration control (i.e., begins the acceleration control process 200). Then, the acceleration control process 200 proceeds to block 202. At block 202, the controller 34 uses the projected-speed table PST to identify a first speed point in violation of the minimum allowed speed $v_{min}$. In other words, the controller 34 identifies the first speed point in the projected-speed table PST that is less than the minimum allowed speed $v_{min}$. After block 202, the acceleration control process 200 continues to block 204.

At block 204, the controller 34, starting at the first speed point identified in block 202, moves forward in the projected-speed table PST until $v_{i+1} > v_i$ in order to find the first local minimum of the projected speed). In the acceleration control process 200, this first local minimum of the projected speed is referred to as $v_{peak}$. After block 204, the method proceeds to block 206. The first local minimum $v_{peak}$ of the projected speed may correspond to a local maximum elevation in the elevation look-ahead table EDT. Thus, controller 34 also determines the local maximum elevation in the elevation look-ahead table EDT and its corresponding index $i_{peak}$ in the elevation look-ahead table EDT. Next, the acceleration control process 200 continues to block 206.

At block 206, the controller 34 determines and stores the distance from the current location of the vehicle 10 to the local maximum elevation and its corresponding index $i_{peak}$ in the elevation look-ahead table EDT. The distance from the current location of the vehicle 10 to the local maximum elevation is referred to as a peak distance $d_{peak}$. After block 206, the acceleration control process 200 continues to block 208.

At block 208, the controller 34 sets the desired speed at the peak distance $d_{peak}$ to be the minimum allowed speed $v_{min}$. After block 208, the acceleration control process 200 proceeds to block 210.

At block 210, the controller 34 computes a scaled, projected-speed table, such as an updated, projected-speed table UPST shown in FIG. 5. To do so, the controller 34 may use the following equation:

$$v_{i,scaled} = v_0 + (v_i - v_0) \left[ \frac{v_0 - v_{min}}{v_0 - v_{peak}} \right]$$

where:

$v_0$ is the current speed of the vehicle 10;

$v_i$ is a projected speed of the vehicle 10 at an index point i;

$v_{min}$ is the minimum allowed speed;

$v_{peak}$ is the first local minimum of the projected speed determined in block 204; and $v_{i,scaled}$ is the scaled, projected speed of the vehicle 10 at an index point i.

By using the above equation, the controller 34 generates a scaled, projected-speed table. Thus, the controller 34 computes the scaled, projected-speed table a function of the minimum allowed speed $v_{min}$ and the first local minimum $v_{peak}$. After block 210, the acceleration control process 200 proceeds to block 212.

At block 212, the controller 34 calculates the required work input W to achieve the minimum allowed speed $v_{min}$ at the peak distance $d_{peak}$. To do so, the controller 34 may use the following equation:

$$W = \frac{m(v_{min}^2 - v_{peak}^2)}{2} \cdot \frac{1}{\eta}$$

where:

m is the mass of vehicle 10;

$v_{peak}$ is the first local minimum of the projected speed determined in block 204;

$\eta$ is a calibratable (and/or learned) engine-to-road efficiency factor;

$v_{min}$ is the minimum allowed speed;

W is the required work input to achieve the minimum allowed speed $v_{min}$ at the peak distance $d_{peak}$.

After determining the required work input W to achieve the minimum allowed speed $v_{min}$ at the peak distance $d_{peak}$, the acceleration control process 200 proceeds to block 214.

At block 214, the controller 34 calculates the adjusted torque $\tau_{req}$ required (if applied constantly) to achieve the minimum allowed speed $v_{min}$ at the peak distance $d_{peak}$ using the following equation:

$$\tau_{req} = \frac{W(i_{peak})r_w}{2} \left[ \left( \sum_{i=1}^{i_{peak}-1} \frac{(v_{i+1} - v_i)}{(v_{i+1}^2 - v_i^2)}(x_{i+1} - x_i) \right) \left( \sum_{i=1}^{i_{peak}} v_i \right) \right]^{-1}$$

where:

$r_w$ is the radius of one of the wheels 17 (i.e., the wheel radius);

$v_i$ is the projected speed at index point i in the scaled, projected-speed table generated in block 210;

$x_i$ is the distance from the current location of the vehicle 10 to the index point i in the scaled, projected-speed table generated in block 210;

$v_{i+1}$ is the projected speed at index point i+1 in the scaled, projected-speed table generated in block 210;

$i_{peak}$ is the index point (i.e., location) at the first local minimum $v_{peak}$ is of the projected speed;

$i_{peak-1}$ is the index point (i.e., location) immediately before the first local minimum $v_{peak}$ is of the projected speed; and $\tau_{req}$ is the adjusted torque required (if applied constantly) to achieve the driver defined speed minimum speed limit $v_{min}$;

At block 214, the efficiency will be maximized if the required work W is added to the system at a constant rate. After block 214, the acceleration control process 200 proceeds to block 216.

At block 216, the controller 34 re-computes the projected speed table assuming that the commanded axle torque is held constant at the sum of the adjusted torque $\tau_{req}$ required (if applied constantly) to achieve the minimum allowed speed $v_{min}$ at the peak distance $d_{peak}$ and the commanded axle torque $\tau_{ss}$ to road load torque at the set speed $v_{ss}$. After block 216, the acceleration control process 200 proceeds to block 218.

At block 218, the controller 34 determines whether there are any speed violations prior to the peak distance $d_{peak}$. If there are minimum speed violations prior to the peak distance $d_{peak}$, then the acceleration control process 200 returns to block 202. If there are maximum speed violations prior to the peak distance $d_{peak}$, then the controller 34 begins the deceleration control process 300 (FIGS. 8A, 8B, 8C, and 8D) at block 112. If there are no speed violations prior to the peak distance $d_{peak}$, then the acceleration control process 200 proceeds to block 220.

At block 220, the controller 34 sets the commanded engine torque to the sum of the adjusted torque $\tau_{req}$ required (if applied constantly) to achieve the minimum allowed speed $v_{min}$ at the peak distance $d_{peak}$ and the commanded axle torque $\tau_{ss}$ to road load torque at the set speed $v_{ss}$. Also, the controller 34 commands the propulsion system 20 to produce an updated, commanded axle torque. This updated, commanded axle torque may be equal to the adjusted torque $\tau_{req}$ required (if applied constantly) to achieve the minimum allowed speed $v_{min}$ at the peak distance $d_{peak}$ plus the commanded axle torque $\tau_{ss}$ to road load torque at the set speed $v_{ss}$. Then, the acceleration control process 200 proceeds to block 222.

Between block 220 and 222, the vehicle 10 travels to the look-ahead point $x_1$ in the elevation look-ahead table EDT. At block 222, the controller 34 sets the peak distance $d_{peak}$ using the following equation:

$$d_{peak} = d_{peak} - dx$$

where:

$d_{peak}$ is the peak distance; and dx is the distance between look-ahead point $x_0$ and look-ahead point $x_1$ in the elevation look-ahead table EDT.

After block 222, the acceleration control process 200 proceeds to block 224.

At block 224, the controller 34 determines whether the newly set peak distance $d_{peak}$ is less than zero. If the newly set peak distance $d_{peak}$ is not less than zero, then the acceleration control process 200 returns to block 216. If the newly set peak distance $d_{peak}$ is less than zero, then the acceleration control process 200 proceeds to block 226. At block 226, the controller 34 exits acceleration control.

FIGS. 9A, 9B, 9C and 9D illustrate the deceleration control process 300. At block 112 (as discussed above), the controller 34 enters deceleration control (i.e., begins the deceleration control process 300). Then, the deceleration control process 300 proceeds to block 302. At block 302, the controller 34 uses the projected-speed table PST to identify a first speed point in violation of the maximum allowed speed $v_{max}$. In other words, the controller 34 identifies the first speed point in the projected-speed table PST that is greater than the maximum allowed speed $v_{max}$. After block 302, the deceleration control process 300 continues to block 304.

At block 304, the controller 34, starting at the first speed point identified in block 302, moves forward in the projected-speed table PST until $v_{i+1} < v_i$ in order to find the first local maximum of the projected speed). In the deceleration control process 300, this first local maximum of the projected speed is referred to as $v_{peak}$. After block 304, the method proceeds to block 306. The first local maximum $v_{peak}$ of the projected speed may correspond to a local minimum elevation in the elevation look-ahead table EDT. Thus, controller 34 also determines the local maximum elevation in the elevation look-ahead table EDT and its corresponding index $i_{peak}$ in the elevation look-ahead table EDT. Next, the deceleration control process 300 continues to block 306.

At block 306, the controller 34 determines and stores the distance from the current location of the vehicle 10 to the local minimum elevation and its corresponding index $i_{peak}$ in the elevation look-ahead table EDT. The distance from the current location of the driven vehicle 10 to the local minimum elevation is referred to as a peak distance $d_{peak}$. After block 304, the deceleration control process 300 continues to block 308.

At block 308, the controller 34 sets the desired speed at the peak distance $d_{peak}$ to be the maximum allowed speed $v_{max}$. After block 308, the deceleration control process 300 proceeds to block 310.

At block 310, the controller 34 computes a scaled, projected-speed table, such as an updated, projected-speed table UPST shown in FIG. 5. To do so, the controller 34 may use the following equation:

$$v_{i,scaled} = v_0 + (v_i - v_0) \left[ \frac{v_{max} - v_0}{v_{peak} - v_0} \right]$$

where:

$v_0$ is the current speed of the vehicle 10;

$v_i$ is a projected speed of the vehicle 10 at an index point i;

$v_{max}$ is the maximum allowed speed;

$v_{peak}$ is the first local maximum of the projected speed determined in block 304; and $v_{i,scaled}$ is the scaled, projected speed of the vehicle 10 at an index point i.

By using the above equation, the controller 34 generates a scaled, projected-speed table. Thus, the controller 34 computes the scaled, projected-speed table a function of the maximum allowed speed $v_{max}$ and the first local maximum $v_{peak}$. After block 310, the deceleration control process 300 proceeds to block 312.

At block 312, the controller 34 calculates the required work input W to achieve the maximum allowed speed $v_{max}$ at the peak distance $d_{peak}$. To do so, the controller 34 may use the following equation:

$$W = \frac{m(v_{peak}^2 - v_{max}^2)}{2} \cdot \frac{1}{\eta}$$

where:

m is the mass of vehicle 10;

$v_{peak}$ is the first local maximum of the projected speed determined in block 304;

$\eta$ is a calibratable engine-to-road efficiency factor;

$v_{max}$ is the maximum allowed speed;

W is the required work input to achieve the maximum allowed speed $v_{min}$ at the peak distance $d_{peak}$.

After determining the required work input W to achieve the maximum allowed speed $v_{max}$ at the peak distance $d_{peak}$, the deceleration control process 300 proceeds to block 314.

At block 314, the controller 34 calculates the adjusted reduction in torque $\tau_{req}$ required (if applied constantly) to achieve the maximum allowed speed $v_{max}$ at the peak distance $d_{peak}$ using the following equation:

$$\tau_{req} = \frac{W(i_{peak})r_w}{2} \left[ \left( \sum_{i=1}^{i_{peak}-1} \frac{(v_{i+1} - v_i)}{(v_{i+1}^2 - v_i^2)} (x_{i+1} - x_i) \right) \left( \sum_{i=1}^{i_{peak}} v_i \right) \right]^{-1}$$

where:

$r_w$ is the radius of one of the wheels 17 (i.e., the wheel radius);

$v_i$ is the projected speed at index point i in the scaled, projected-speed table generated in block 210;

$x_i$ is the distance from the current location of the vehicle 10 to the index point i in the scaled, projected-speed table generated in block 210;

$v_{i+1}$ is the projected speed at index point i+1 in the scaled, projected-speed table generated in block 210;

$i_{peak}$ is the index point (i.e., location) at the first local minimum $v_{peak}$ is of the projected speed;

$i_{peak-1}$ is the index point (i.e., location) immediately before the first local minimum $v_{peak}$ is of the projected speed; and $\tau_{req}$ is the adjusted torque required (if applied constantly) to achieve the maximum driver defined speed limit $v_{max}$;

At block 314, the efficiency will be maximized if the required work W is added to the system at a constant rate. After block 314, the deceleration control process 300 proceeds to block 316.

At block 316, the controller 34 re-computes the projected speed table assuming that the commanded axle torque is held constant at the sum of the adjusted reduction in torque $\tau_{req}$ required (if applied constantly) to achieve the maximum allowed speed $v_{max}$ at the peak distance $d_{peak}$ and the commanded axle torque $\tau_{ss}$ to road load torque at the set speed $v_{ss}$. After block 316, the deceleration control process 300 proceeds to block 318.

At block 318, the controller 34 determines whether there are any speed violations prior to the peak distance $d_{peak}$. If there are maximum speed violations prior to the peak distance $d_{peak}$, then the deceleration control process 300 returns to block 302. If there are minimum speed violations prior to the peak distance $d_{peak}$, then the controller 34 begins the acceleration control process 200 (FIGS. 7A, 7B, and 7C) at block 114. If there are no speed violations prior to the peak distance $d_{peak}$, then the deceleration control process 300 proceeds to block 320.

At block 320, the controller 34 compares the absolute value of the adjusted reduction in torque $\tau_{req}$ required (if applied constantly) to achieve the maximum allowed speed $v_{max}$ at the peak distance $d_{peak}$ with the absolute value of the torque necessary to run the air-conditioning system 29 (i.e., the maximum alternator torque). If the absolute value of the adjusted reduction in torque $\tau_{req}$ required (if applied constantly) to achieve the maximum allowed speed $v_{max}$ at the peak distance $d_{peak}$ is greater than the absolute value of the torque necessary to run the air-conditioning system 29, then the deceleration control process 300 proceeds to block 322. If the absolute value of the adjusted reduction in torque $\tau_{req}$ required (if applied constantly) to achieve the maximum allowed speed $v_{max}$ at the peak distance $d_{peak}$ is not greater than the absolute value of the torque necessary to run the air-conditioning system 29, then the deceleration control process 300 proceeds to block 324.

At block 324, the controller 34 maintains the commanded axle torque $\tau_{ss}$. Also, the adjusted reduction in torque $\tau_{req}$ required (if applied constantly) to achieve the maximum allowed speed $v_{max}$ at the peak distance $d_{peak}$ is provided via battery regeneration. In the battery regeneration, the propulsion system 20 charges the battery 21 of the vehicle 10. After block 324, the deceleration control process 300 proceeds to block 340.

At block 340, the vehicle 10 travels to look-ahead point $x_1$ in the elevation look-ahead table EDT. After block 340, the deceleration control process 300 proceeds to block 342.

At block 342, the controller 34 sets the peak distance $d_{peak}$ using the following equation:

$$d_{peak} = d_{peak} - dx$$

where:

$d_{peak}$ is the peak distance; and dx is the distance between look-ahead pint $x_0$ and look-ahead point $x_1$ in the elevation look-ahead table EDT.

After block 342, the deceleration control process 300 proceeds to block 344.

At block 344, the controller 34 determines whether the newly set peak distance $d_{peak}$ is less than zero. If the newly set peak distance $d_{peak}$ is not less than zero, then the deceleration control process 300 returns to block 316. If the newly set peak distance $d_{peak}$ is less than zero, then the deceleration control process 300 proceeds to block 346. At block 346, the controller 34 exits deceleration control.

At block 322, the controller 34 commands the propulsion system 20 to engage a maximum battery regeneration. In the maximum battery regeneration, the propulsion system 20 charges the battery 21 of the vehicle 10. In the second deceleration mode, the propulsion system 20 drives a compressor 31 of the air conditioning system 29. At block 322, the controller 34 sets the absolute value of the adjusted reduction in torque $\tau_{req}$ required (if applied constantly) to achieve the maximum allowed speed $v_{max}$ at the peak distance $d_{peak}$ to be equal to the absolute value of the adjusted reduction in torque $\tau_{req}$ required (if applied constantly) to achieve the maximum allowed speed $v_{max}$ at the peak distance $d_{peak}$ minus the torque necessary to run the air-conditioning system 29. After block 322, the deceleration control process 300 proceeds to block 326.

At block 326, the controller 34 determines if the air conditioning system 29 is on. If the air conditioning system 29 is on, then the deceleration control process 300 proceeds to block 328. If the air conditioning system 29 is off, then the deceleration control process 300 proceeds to block 330.

At block 328, the controller 34 compares the absolute value of the newly set adjusted reduction in torque $\tau_{req}$ required (if applied constantly) to achieve the maximum allowed speed $v_{max}$ at the peak distance $d_{peak}$ with the absolute value of the torque necessary to run the air-conditioning system 29 (i.e., the maximum A/C compressor torque). The maximum A/C compressor torque is the maximum torque required to run the compressor 31 of the air-conditioning system 29. If the absolute value of the adjusted reduction in torque $\tau_{req}$ required (if applied constantly) to achieve the maximum allowed speed $v_{max}$ at the peak distance $d_{peak}$ is greater than the absolute value of the torque necessary to run the air-conditioning system 29, then the deceleration control process 300 proceeds to block 332. If the absolute value of the adjusted reduction in torque $\tau_{req}$ required (if applied constantly) to achieve the maximum allowed speed $v_{max}$ at the peak distance $d_{peak}$ is not greater than the absolute value of the torque necessary to run the air-conditioning system 29, then the deceleration control process 300 proceeds to block 334.

At block 332, the controller 34 sets the maximum A/C compressor load to maximum for current climate settings. At block 332, the controller 34 sets the absolute value of the newly set adjusted reduction in torque $\tau_{req}$ required (if applied constantly) to achieve the maximum allowed speed $v_{max}$ at the peak distance $d_{peak}$ to be equal to the absolute value of the adjusted reduction in torque $\tau_{req}$ required (if applied constantly) to achieve the maximum allowed speed $v_{max}$ at the peak distance $d_{peak}$ minus the maximum torque required to run the compressor 31 of the air-conditioning system 29. After block 332, the deceleration control process 300 proceeds to block 330.

At block 334, the controller 34 maintains the commanded axle torque $\tau_{ss}$. Also, the adjusted reduction in torque $\tau_{req}$ required (if applied constantly) to achieve the maximum allowed speed $v_{max}$ at the peak distance $d_{peak}$ is provided via the A/C compressor load (i.e., the load of the compressor 31 of the air-conditioning system 29. After block 334, the deceleration control process 300 proceeds to block 340.

At block 330, the controller 34 compares the absolute value of the newly set adjusted reduction in torque $\tau_{req}$ required (if applied constantly) to achieve the maximum allowed speed $v_{max}$ at the peak distance $d_{peak}$ with the absolute value of the torque necessary to run the air-conditioning system 29. If the absolute value of the newly set adjusted reduction in torque $\tau_{req}$ required (if applied constantly) to achieve the maximum allowed speed $v_{max}$ at the peak distance $d_{peak}$ is greater than the absolute value of the torque necessary to run the air-conditioning system 29, then the deceleration control process 300 proceeds to block 336. If the absolute value of the newly set adjusted reduction in torque $\tau_{req}$ required (if applied constantly) to achieve the maximum allowed speed $v_{max}$ at the peak distance $d_{peak}$ is not greater than the absolute value of the torque necessary to run the air-conditioning system 29, then the deceleration control process 300 proceeds to block 338.

At block 336, the controller 34 sets the virtual pedal input to zero (tip out completely). In other words, the controller 34 commands the propulsion system 20 to produce zero torque. At block 336, the controller 34 commands the brake system 26 to actuate to provide the remaining commanded axle torque $\tau_{ss}$. After block 336, the deceleration control process 300 proceeds to block 340.

At block 338, the controller 34 sets the commanded engine torque to the sum of the adjusted reduction in torque $\tau_{req}$ required (if applied constantly) to achieve the maximum allowed speed $v_{max}$ at the peak distance $d_{peak}$ and the commanded axle torque $\tau_{ss}$ to road load torque at the set speed $v_{ss}$. In other words, the controller 34 commands the propulsion system 20 to reduce the commanded axle torque to the sum of the adjusted reduction in torque $\tau_{req}$ required (if applied constantly) to achieve the maximum allowed speed $v_{max}$ at the peak distance $d_{peak}$ and the commanded axle torque $\tau_{ss}$ to road load torque at the set speed $v_{ss}$. After block 338, the deceleration control process 300 proceeds to block 340.

FIGS. 10A and 10B schematically illustrate a flowchart of the headway control algorithm or process 400 of the cruise control method 100 (FIG. 8). As discussed above, the headway control process 400 begins at block 109. Then, the headway control process 400 proceeds to block 402. At block 402, the controller 34 computes and generates a table of times required for the driven vehicle 10 to reach each distance breakpoints $x_0$, $x_1$, $x_2$, etc. (i.e., the first distance table in FIG. 6) using the open-road projected speeds (i.e., projected-speed table PST or updated, projected-speed table UPST if the commanded axle torque was adjusted). Stated differently, the controller 34 is programmed to generate a table of times required for the driven vehicle 10 to reach each of the predetermined-upcoming locations i.e., the first distance table FDT in FIG. 6) using the projected-speed table (i.e., projected-speed table PST or updated, projected-speed table UPST if the commanded axle torque was adjusted). After block 402, the headway control process 400 proceeds to block 404. Alternatively, the controller 34 may execute block 402 and 404 simultaneously to minimize the time it takes to execute the headway control process 400.

At block 404, the controller 34 computes and generates a similar table for the followed vehicle 11. Specifically, given the initial following distance from the driven vehicle 10 to the followed vehicle 11, the speed of the followed vehicle 11, and the acceleration of the followed vehicle 11, the controller 34 computes how long it will take the followed vehicle 11 to reach the same distance breakpoints $x_0$, $x_1$, $x_2$, etc. (i.e., the first distance table in FIG. 6). As discussed above, the controller 34 may determine the initial following distance from the driven vehicle 10 to the followed vehicle 11 at the first distance breakpoint $x_0$ (first predetermined-upcoming location), the speed of the followed vehicle 11, and the acceleration of the followed vehicle 11 using the sensor devices 40, such as radars or forward-looking cameras. Therefore, the controller 34 generates the second distance table SDT (FIG. 6), which includes the times required for the followed vehicle to reach each of the predetermined-upcoming locations. Next, the headway control process 400 proceeds to block 406.

At block 406, for all the predetermined-upcoming locations in the first distance table FDT (FIG. 6) and the second distance table SDT (FIG. 6) where the distance $x_i$ is less than a predetermined calibratable distance, the controller 34 calculates the difference between the time required for the driven vehicle 10 to reach each of the predetermined-upcoming locations (as shown in the first distance table FDT) and the time required for the followed vehicle 11 to reach each of the predetermined-upcoming locations to determine each of the following times at each predetermined-upcoming location, thereby generating the following time table FTT. To do so, at each predetermined-upcoming location (i.e., distance $x_i$) that is less than the predetermined calibratable distance, the controller 34 subtracts the time it will take the followed vehicle 11 to reach the distance $x_i$ from the time it will take the driven vehicle 10 to reach the same distance $x_i$ to obtain the following time at each of the predetermined-upcoming location (i.e., at each distance $x_i$). The distance $x_i$ may be referred to as point $x_i$, and the time required to reach the distance $x_i$ may be expressed as a function of time $t(x)$ or $t(x_i)$. The headway control process 400 then proceeds to block 408.

At block 408, the controller 34 determines whether any points in the array (i.e., table) generated in block 406 is less than the predetermined-minimum time threshold. In other words, the controller 34 compares the following times with the predetermined-minimum time threshold to determine whether at least one of the following times (determined in block 406) is less than the predetermined-minimum time threshold. The predetermined-minimum time threshold is equal to a minimum following time $t_{min}$ times a first safety factor $\alpha$. If none of the following times (determined in block 406) is less than the predetermined-minimum time threshold, then the headway control process 400 proceeds to block 410.

At block 410, the controller 34 maintains commands the propulsion system 20 to maintain the commanded axle torque. In other words, the controller 34 commands the propulsion system 20 to maintain the commanded axle torque in response to determining that each of the determined following times is equal to or greater than the predetermined-minimum time threshold. After block 410, the headway control process 400 proceeds to block 412.

At block 412, the controller 34 exits from the headway control process 400, and the method 100 proceeds to block 104. In other words, at block 412, the headway control process 400 passes its check.

Returning to block 406, if the controller 34 determines that at least one of the following times is less than the predetermined-minimum time threshold, then the headway control process 400 proceeds to block 414.

At block 414, the controller 34 commands the propulsion system 20 of the driven vehicle 10 to decrease the commanded axle torque by a torque adjustment in order to prevent each of the following times at each of the predetermined-upcoming locations from being less than the predetermined-minimum time threshold in response to determining that at least one of the following times is less than the predetermined-minimum time threshold. As a result, the controller 34 prevents the driven vehicle 10 from reaching the followed vehicle 11 during cruise control. Specifically, if there is a projected violation of the predetermined-minimum time threshold before a predetermined calibratable distance D, then the axle torque command will be reduced to prevent the driven vehicle 10 from too closely following the followed vehicle 11. The controller 34 commands the propulsion system 20 to modify the commanded axle torque so that, at distance $x_{crit}$ (i.e., the distance at which the violation occurs):

$$V_{veh}(x_{crit}) = V_f(x_{crit}) \text{ and } (t(x_{crit}) - t_f(x_{crit})) = \beta t_{min}*$$

where:

$V_{veh}(x_{crit})$ is a speed of the driven vehicle 10 at the distance $x_{crit}$ (i.e., the distance at which the violation occurs);

$V_f(x_{crit})$ is a speed of the followed vehicle 11 at the distance $x_{crit}$ (i.e., the distance at which the violation occurs);

$t(x_{crit})$ is a following time of the driven vehicle 10 at the distance $x_{crit}$ (i.e., the distance at which the violation occurs);

$t_f(x_{crit})$ is a following time of the followed vehicle 11 at the distance $x_{crit}$ (i.e., the distance at which the violation occurs);

$t_{min}*$ is predetermined-minimum time threshold; and $\beta$ is a second safety factor that is greater than the first safety factor $\alpha$ in order to avoid violating the predetermined-minimum time threshold.

$\beta$ is a second calibratable second safety factor that is greater than the first safety factor $\alpha$ in order to avoid violating the predetermined-minimum time threshold. This will ensure that the controller 34 targets an acceptable following time $\beta t_{min}*$ and matches the speed of the followed vehicle 11 at this minimum following time. The axle torque change required to achieve these conditions (i.e. the torque adjustment) is summarized in the following relation:

$$\tau_{az} = r_w m \left[ \frac{[v_c - v_{f(x_{crit})}]}{[t_c + t_{f(x_{crit})} - \beta t_{min}^*]} \right] - \frac{1}{x_N} \sum_{i=0}^{N-1} a_i \Delta x_i$$

where:

$\Delta\tau_{az}$ is a change in axle torque to meet a plurality of auto-following distance constraints;

$v_c$ is the current speed of the driven vehicle;

$v_{f(x_{crit})}$ is a speed of the followed vehicle at a distance $x_{crit}$;

$x_{crit}$ is a distance at which a violation of the predetermined-minimum time threshold occurs;

$t_c$ is a current following time;

$t_{f(x_{crit})}$ is a time required for the followed vehicle to reach the distance $x_{crit}$;

$a_i$ is a vehicle acceleration of the driven vehicle at index i.

$\Delta x_i$ is an incremental distance between cells i and cell i+1;

$r_w$ is a rolling radius of a wheel of the driven vehicle in millimeters; and m is a mass of the driven vehicle in kilograms;

$\beta$ is a second safety factor that is greater than the first safety factor in order to avoid violating the predetermined-minimum time threshold; and $t_{min}^*$ is the predetermined-minimum time threshold.

After block 414, the method proceeds to block 416. At block 416, given the new axle torque command (i.e., the torque adjustment) determined in block 414, the controller 34 re-computes the projected speed tables PST of the driven vehicle 10 and the followed vehicle 11 and the time/distance tables (i.e., the first distance table FDT, the second distance table SDT, and the following time table FTT). The headway control algorithm 400 returns to block 406.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A cruise control method to control a driven vehicle, comprising:

receiving, by a controller of the driven vehicle, a maximum allowed speed, the minimum allowed speed, and a set speed;

commanding, by the controller, a propulsion system to produce a commanded axle torque to maintain the set speed;

monitoring a current speed of the driven vehicle;

monitoring an elevation of a terrain at predetermined-upcoming locations of the driven vehicle;

determining projected speeds of the driven vehicle at each of the predetermined-upcoming locations using the current speed of the driven vehicle and the elevation of the terrain at the predetermined-upcoming locations;

monitoring a current speed of a followed vehicle, wherein the followed vehicle is driving directly in front of the driven vehicle;

determining projected speeds of the followed vehicle at each of the predetermined-upcoming locations using the current speed of the followed vehicle and the elevation of the terrain at the predetermined-upcoming locations;

determining a plurality of following times at each of the predetermined-upcoming locations using the projected speeds of the driven vehicle and the projected speeds of the followed vehicle, wherein each of the plurality of following times is a time required for the driven vehicle to reach the followed vehicle;

comparing each of the plurality of following times with a predetermined-minimum time threshold;

determining whether at least one of the plurality of following times is less than the predetermined-minimum time threshold;

in response to determining that at least one plurality of following times is less than the predetermined-minimum time threshold, commanding, by the controller, the propulsion system of the driven vehicle to decrease the commanded axle torque by a torque adjustment in order to prevent each of the plurality of following times at each of the predetermined-upcoming locations from being less than the predetermined-minimum time threshold; and wherein the torque adjustment is calculated using the following equation:

$$\Delta\tau_{az} = r_w m \left[ \frac{[v_c - v_{f(x_{crit})}]}{[t_c + t_{f(x_{crit})} - \beta t_{min}^*]} \right] - \frac{1}{x_N} \sum_{i=0}^{N-1} a_i \Delta x_i$$

where:

$\Delta\tau_{az}$ is a change in axle torque to meet a plurality of auto-following distance constraints;

$v_c$ is the current speed of the driven vehicle;

$v_{f(x_{crit})}$ is a speed of the followed vehicle at a distance $x_{crit}$;

$x_{crit}$ is a distance at which a violation of the predetermined-minimum time threshold occurs;

$t_c$ is a current following time;

$t_{f(x_{crit})}$ is a time required for the followed vehicle to reach the distance $x_{crit}$;

$a_i$ is a vehicle acceleration of the driven vehicle an index i;

$\Delta x_i$ is an incremental distance between cells i and cell i+1;

$r_w$ is a rolling radius of a wheel of the driven vehicle in millimeters; and m is a mass of the driven vehicle in kilograms;

$\beta$ is a second safety factor that is greater than the first safety factor in order to avoid violating the predetermined-minimum time threshold; and $t_{min}^*$ is the predetermined-minimum time threshold.

2. The cruise control method of claim 1, further comprising generating a projected-speed table using the projected speeds of the driven vehicle at each of the predetermined-upcoming locations of the driven vehicle, wherein the driven vehicle includes a user interface configured to allow a user to set the maximum allowable speed and the minimum allowable speed.

3. The cruise control method of claim 2, further comprising generating a table of times required for the driven vehicle to reach each of the predetermined-upcoming locations using the projected-speed table.

4. The cruise control method of claim 3, further comprising generating a table of the times required for the followed vehicle to reach each of the predetermined-upcoming locations.

5. The cruise control method of claim 4, wherein the times required for the followed vehicle to reach each of the predetermined-upcoming locations is determined using the projected speeds of the followed vehicle at each of the predetermined-upcoming locations, a vehicle acceleration of the followed vehicle, and an initial distance between the driven vehicle and the followed vehicle at a first one of the predetermined-upcoming locations.

6. The cruise control method of claim 5, further comprising determining a speed of the followed vehicle, the vehicle acceleration of the followed vehicle, and the initial distance between the driven vehicle and the followed vehicle at the first one of the predetermined-upcoming locations using one or more radars of the driven vehicle.

7. The cruise control method of claim 6, further comprising determining a difference between the times required for the driven vehicle to reach each of the predetermined-upcoming locations using the projected-speed table and the times required for the followed vehicle to reach each of the predetermined-upcoming locations to determine each of the plurality of following times.

8. The cruise control method of claim 7, further comprising, in response to determining that each of the plurality of following times is equal to or greater than the predetermined-minimum time threshold, commanding, by the controller, the propulsion system of the driven vehicle to maintain the commanded axle torque.

9. The cruise control method of claim 8, further comprising determining the torque adjustment, wherein:
the predetermined-minimum time threshold is equal to a minimum following time times a first safety factor; and
the torque adjustment is a function of a current speed of the driven vehicle, a current speed of the followed vehicle, and a vehicle acceleration of the driven vehicle at the predetermined-upcoming locations.

10. A vehicle system, comprising:
a propulsion system;
a controller in communication with the propulsion system, wherein the controller is programmed to:
receive a set speed;
command the propulsion system to produce a commanded axle torque to maintain the set speed;
monitor a current speed of a driven vehicle of the vehicle system;
monitor an elevation of a terrain at predetermined-upcoming locations of the driven vehicle;
determine projected speeds of the driven vehicle at each of the predetermined-upcoming locations using the current speed of the driven vehicle and the elevation of the terrain at the predetermined-upcoming locations;
monitor a current speed of a followed vehicle, wherein the followed vehicle is driving directly in front of the driven vehicle;
determine projected speeds of the followed vehicle at each of the predetermined-upcoming locations using the current speed of the followed vehicle and the elevation of the terrain at the predetermined-upcoming locations;
determine a plurality of following times at each of the predetermined-upcoming locations using the projected speeds of the driven vehicle and the projected speeds of the followed vehicle, wherein each of the plurality of following times is a time required for the driven vehicle to reach the followed vehicle;
compare each of the plurality of following times with a predetermined-minimum time threshold;
determine whether at least one of the plurality of following times is less than the predetermined-minimum time threshold;
in response to determining that at least one plurality of following times is less than the predetermined-minimum time threshold, command the propulsion system of the driven vehicle to decrease the commanded axle torque by a torque adjustment in order to prevent each of the plurality of following times at each of the predetermined-upcoming locations from being less than the predetermined-minimum time threshold; and
wherein the torque adjustment is calculated using the following equation:

$$\Delta\tau_{az} = r_w m \left[ \frac{[v_c - v_{f(x_{crit})}]}{[t_c + t_{f(x_{crit})} - \beta t^*_{min}]} \right] - \frac{1}{x_N} \sum_{i=0}^{N-1} a_i \Delta x_i$$

where:
$\Delta\tau_{az}$ is a change in axle torque to meet a plurality of auto-following distance constraints;
$v_c$ is the current speed of the driven vehicle;
$v_{f(x_{crit})}$ is a speed of the followed vehicle at a distance $x_{crit}$;
$x_{crit}$ is a distance at which a violation of the predetermined-minimum time threshold occurs;
$t_c$ is a current following time;
$t_{f(x_{crit})}$ is a time required for the followed vehicle to reach the distance $x_{crit}$;
$a_i$ is a vehicle acceleration of the driven vehicle an index i;
$\Delta x_i$ is an incremental distance between cells i and cell i+1;
$r_w$ is a rolling radius of a wheel of the driven vehicle in millimeters; and
m is a mass of the driven vehicle in kilograms;
$\beta$ is a second safety factor that is greater than the first safety factor in order to avoid violating the predetermined-minimum time threshold; and
$t_{min}^*$ is the predetermined-minimum time threshold.

11. The vehicle system of claim 10, wherein the controller is programmed to generate a projected-speed table using the projected speeds of the driven vehicle at each of the predetermined-upcoming locations of the driven vehicle.

12. The vehicle system of claim 11, wherein the controller is programmed to generate a table of times required for the driven vehicle to reach each of the predetermined-upcoming locations using the projected-speed table.

13. The vehicle system of claim 12, wherein the controller is programmed to generate a table of the times required for the followed vehicle to reach each of the predetermined-upcoming locations.

14. The vehicle system of claim 13, wherein the times required for the followed vehicle to reach each of the predetermined-upcoming locations is determined using the projected speeds of the followed vehicle at each of the predetermined-upcoming locations, a vehicle acceleration of the followed vehicle, and an initial distance between the driven vehicle and the followed vehicle at a first one of the predetermined-upcoming locations.

15. The vehicle system of claim 14, wherein the controller is programmed to determine a speed of the followed vehicle, the vehicle acceleration of the followed vehicle, and the initial distance between the driven vehicle and the followed vehicle at the first one of the predetermined-upcoming locations using one or more radars of the driven vehicle.

16. The vehicle system of claim 15, wherein the controller is programmed to determine a difference between the times required for the driven vehicle to reach each of the predetermined-upcoming locations using the projected-speed table and the times required for the followed vehicle to reach each of the predetermined-upcoming locations to determine each of the plurality of following times.

17. The vehicle system of claim 16, wherein the controller is programmed to, in response to determining that each of the plurality of following times is equal to or greater than the predetermined-minimum time threshold, command the propulsion system of the driven vehicle to maintain the commanded axle torque.

18. The vehicle system of claim 17, wherein:
the controller is programmed to determine the torque adjustment;
the predetermined-minimum time threshold is equal to a minimum following time times a first safety factor; and
the torque adjustment is a function of a current speed of the driven vehicle, a current speed of the followed vehicle, and a vehicle acceleration of the driven vehicle at the predetermined-upcoming locations.

\* \* \* \* \*